(12) United States Patent
Matsushima et al.

(10) Patent No.: US 10,089,620 B2
(45) Date of Patent: Oct. 2, 2018

(54) RECORDING MEDIUM, LICENSE MANAGEMENT APPARATUS, AND RECORDING AND PLAYBACK APPARATUS

(75) Inventors: Hideki Matsushima, Hirakata (JP); Shunji Harada, Osaka (JP); Yasushi Uesaka, Sanda (JP); Teruto Hirota, Moriguchi (JP); Masayuki Kozuka, Arcadia, CA (US); Masataka Nikaido, Shijonawate (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 2910 days.

(21) Appl. No.: 10/048,546

(22) PCT Filed: May 30, 2001

(86) PCT No.: PCT/US01/17291
§ 371 (c)(1),
(2), (4) Date: May 2, 2002

(87) PCT Pub. No.: WO01/95206
PCT Pub. Date: Dec. 13, 2001

(65) Prior Publication Data
US 2002/0165825 A1    Nov. 7, 2002

Related U.S. Application Data

(63) Continuation-in-part of application No. 09/585,424, filed on Jun. 2, 2000, now abandoned.

(51) Int. Cl.
*G06F 21/10*   (2013.01)
*G06Q 20/36*   (2012.01)

(52) U.S. Cl.
CPC ......... *G06Q 20/3674* (2013.01); *G06F 21/10* (2013.01); *G06F 21/105* (2013.01);
(Continued)

(58) Field of Classification Search
CPC .................................................. G06Q 20/3674
(Continued)

(56) References Cited

U.S. PATENT DOCUMENTS

| 5,553,143 A | 9/1996 | Ross et al. |
| 5,715,403 A | 2/1998 | Stefik |

(Continued)

FOREIGN PATENT DOCUMENTS

| JP | 8-263440 | 10/1996 |
| JP | 11-259964 | 9/1999 |

(Continued)

OTHER PUBLICATIONS

History of Semiconductor, Hong Xiao, PhD, of Motorola, (http://www2.austin.cc.tx.us/HongXiao/overview/history-semi/sld001.htm).*

(Continued)

*Primary Examiner* — Calvin L Hewitt, II
*Assistant Examiner* — Cristina Owen Sherr
(74) *Attorney, Agent, or Firm* — Wenderoth, Lind & Ponack, L.L.P.

(57) ABSTRACT

An audio object (AOB) for which corresponding rights management information (RMI) has been generated by a license management apparatus, and an AOB for which RMI does not exist are written into a recording medium for use in an SDMI system which includes the license management apparatus. Each AOB is put in correspondence with a migration permission flag (MPF). When the corresponding AOB is the AOB for which RMI does not exist, the relevant MPF is set to on so as to show that a migration procedure is permitted. When the corresponding AOB is the AOB for which RMI has been generated by the license management apparatus, the relevant MPF is set to off so as to show that a migration procedure is not permitted.

2 Claims, 25 Drawing Sheets

(52) U.S. Cl.
CPC ............... *G06F 2221/0777* (2013.01); *G06F 2221/2153* (2013.01)

(58) Field of Classification Search
USPC ...... 705/51–59; 713/170, 176; 380/203, 241
See application file for complete search history.

(56) References Cited

U.S. PATENT DOCUMENTS

| | | | |
|---|---|---|---|
| 5,920,861 A * | 7/1999 | Hall | ........................ G06F 21/10 |
| 5,940,504 A | 8/1999 | Griswold | |
| 6,073,124 A | 6/2000 | Krishnan et al. | |
| 6,226,618 B1 | 5/2001 | Downs et al. | |
| 6,240,185 B1 | 5/2001 | Van Wie et al. | |
| 6,421,779 B1 * | 7/2002 | Kuroda | ................. H04L 9/3263 713/169 |
| 6,611,607 B1 * | 8/2003 | Davis | ................ G06F 17/30876 348/E7.061 |
| 6,636,689 B1 * | 10/2003 | Stebbings | ........................ 386/94 |
| 6,684,199 B1 * | 1/2004 | Stebbings | ........................ 705/57 |
| 6,748,485 B1 | 6/2004 | Yokota | |
| 6,847,950 B1 | 1/2005 | Kamibayashi | |
| 6,853,727 B1 * | 2/2005 | Foster | ................. G06F 21/6218 360/15 |
| 6,859,535 B1 * | 2/2005 | Tatebayashi et al. | ......... 380/201 |
| 2002/0118394 A1 * | 8/2002 | Mckinley et al. | ........... 358/3.28 |
| 2005/0144138 A1 | 6/2005 | Kamibayashi | |

FOREIGN PATENT DOCUMENTS

| | | |
|---|---|---|
| JP | 2000-315177 | 11/2000 |
| JP | 2001-125833 | 5/2001 |

OTHER PUBLICATIONS

A Brief History of Microprocessors (http://www.eee.bham.ac.uk/woolleysi/teaching/microhistory.htm).*
Abbreviation dictionary for Engineers (http://www.geocities.jp/technoart_jp/Abbreviation/abbrev_e_SEM.html).*
SEMATECH Acronyms and Abbreviations ((http://www.sematech.org/publications/acronyms/index.htm).*
The Free Dictionary by Farlex (http://acronyms.thefreedictionary.com/sd).*
SDMI Portable Device Specification, Part 1, Version 1.0 (35 pages); Jul. 8, 1999.
Amendment 1 to SDMI Portable Device Specification, Part 1, Version 1.0 (2 pages); Sep. 23, 1999.
Guide to SDMI Portable D vic Specification, Part 1, V rsion 1.0 (5 pag s).
Supplementary European Search Report dated Sep. 27, 2010 issued in corresponding EP Application No. 01946007.0.
"Amendment 1 to SDMI Portable Device Specification, Part 1, Version 1.0," SDMI Secure Digital Music Initiative, Sep. 23, 1999, pp. 1 and 2.
"Memory Stick Copyright Protection Technology—Magic-Gate—," Techno World, May 22, 2000, pp. 1-4.
Bloom, et al., "Copy Protection for DVD Video," Proceedings of the IEEE, vol. 87, No. 7, Jul. 1999, pp. 1267-1276.
"Prevention of Illegal Copying in a Digital-Contents Distribution System", Information Processing Society of Japan Notes, vol. 200, No. 13, pp. 20-21, published 2001 (including English Translation).
"Prevention of Illegal Copying in a Digital-Contents Distribution System", Information Processing Society of Japan Notes, vol. 2000, No. 13, pp. 20-21, published 2000 (including English Translation).

* cited by examiner

MPF: 0
  Migration Prohibited
  (Right Management Information corresponding to AOB already generated)

MPF: 1
  Migration Permitted
  (Right Management Information corresponding to AOB not yet generated)

FIG. 7
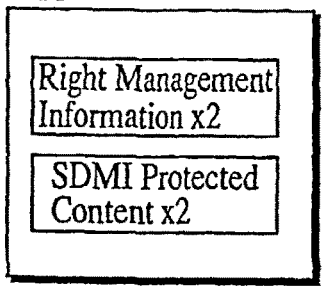
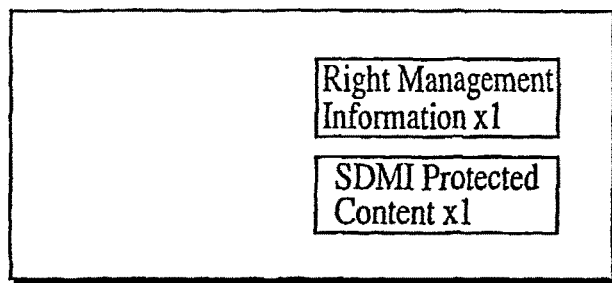
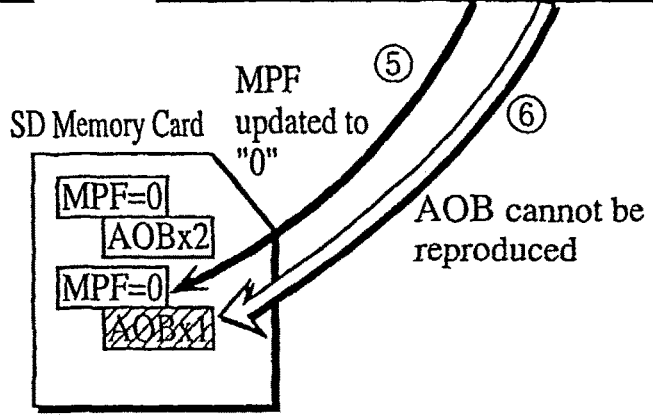
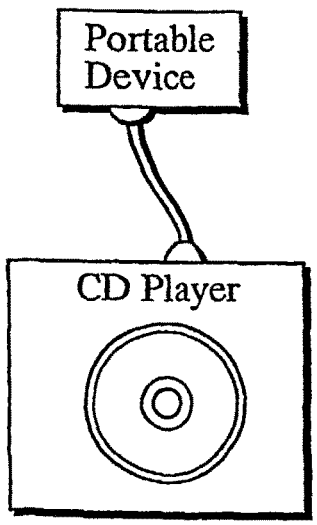

FIG. 16  Dividing Track C into Track C,F

MPF : 0
 Migration Prohibited
 (Right Management Information corresponding to AOB already generated)

MPF : 1
 Migration Permitted
 (Right Management Information corresponding to AOB not yet generated)

RECORDING MEDIUM, LICENSE MANAGEMENT APPARATUS, AND RECORDING AND PLAYBACK APPARATUS

This is a continuation-in-part under 35 USC § 120 of U.S. application Ser. No. 09/585,424, filed Jun. 2, 2000, now abandoned which is incorporated herein by reference.

FIELD OF THE INVENTION

The present invention relates to a recording medium, a license management apparatus, and a recording and playback apparatus. In particular, the present invention relates to an improvement in recording audio data which is obtained as a backup of packaged content recorded on a CD or a DVD-Audio.

BACKGROUND OF THE INVENTION

Technology for backing up CDs using compression CODEC such as MP3 is, ironically, becoming a threat to the profits of copyright holders of the content. This is because the act of distributing audio data which is obtained for making a backup (hereinafter "backup audio data") through the Internet and so on without the authorization of the copyright holder occurs throughout the world. In light of such circumstances, SDMI (Secure Digital Music Initiative) specifies the following two methods for backing up packaged contents that are recorded on a CD.

In the first method, a license management apparatus makes a backup of the CD, and in the second method a portable device makes a backup of the CD. A license management apparatus is equipment such as a personal computer that is equipped with software which is called a licensed compliant module (hereinafter "LCM"). A portable device (hereinafter "PD") is an audio device that is not equipped with an LCM. The LCM in a license management apparatus allows the license management apparatus to perform the function of managing audio data that is obtained by backing up. In detail, the license management apparatus performs the function of generating and updating copyright management information about backup audio data. In contrast, since a PD does not have an LCM, the PD does not perform such a management function, but is limited to performing functions such as recording and playback of audio data. Both PDs and license management apparatuses encrypt, by using a predetermined encryption key, audio data which is obtained by compression coding of packaged contents, and then record the audio data on a recording medium. In principle, PDs and license management apparatuses prohibit copying of audio data from the recording medium to another recording medium. Consequently, it is not possible for backup audio data to be sold over a network. Check-in and check-out procedures which are performed by the license management apparatus are an exception to this principle of copy prohibition. Check-out, just as a guest leaves a hotel, is the act of recording backup audio data which is managed in the license management apparatus on a portable recording medium such as a semiconductor memory card. According to this, backup audio data can be transferred from the license management apparatus and can be used in a PD. Conversely, check-in, as if to call the guest back to the hotel, is the act of returning the backup audio data which is recorded on the portable recording medium to the license management apparatus. By returning the audio data which is recorded on the portable recording medium to the license management apparatus, the portable recording apparatus can be used to store other audio data.

However, since PDs cannot perform right management, when a backup is performed in a PD, exceptional copying such as check-in and check-out cannot be performed. This gives rise to a problem that the user is given an impression that usability is poor as compared to technology which makes a backup by using a license management apparatus.

SUMMARY OF THE INVENTION

A way to solve the above-described problem is to have a license management apparatus perform migration of audio data which is recorded by a PD. Migration means that a license management apparatus generates right management information for audio data which has been recorded on a recording medium, and places the audio data under the management of the license management apparatus, in correspondence with the right management information. However, the following problem occurs when audio data which is recorded by a PD and audio data which is recorded according to check-out by a license management apparatus are recorded on the same recording medium, and the license management apparatus tries to perform migration. There is no problem when the audio data which is recorded by the PD is migrated, but there is a danger that the audio object which is obtained according to check-out will also be migrated.

The audio object obtained according to check-out already has right management information stored in a license management apparatus, and therefore, if this audio object is migrated, the right management information for the one object will be duplicated. Right management information includes a number of permitted check-outs such as three. Therefore, if the audio object for which right management information has already been generated is migrated two or three times, the right management information will be generated in duplicate or triplicate, meaning that in reality check-out is permitted six or nine times. This means that check-out is not only performed more times than necessary, but it leads to an endless chain of copying.

The object of the present invention is therefore to provide a recording medium which has an information structure that prevents right management information for one audio object being managed in duplicate or triplicate, while limiting execution of migration to audio objects which are generated by a PD.

The above-described object is achieved by a recording medium for use with a plurality of apparatuses, where an audio object and a flag are recorded on the recording medium. The flag is (a) set to off when right management information for the audio object has been generated by any of the plurality of apparatuses so as to show an instruction that a migration procedure is not permitted, and (b) set to on when right management information is yet to be generated so as to show an instruction that the migration procedure is permitted. Here, the migration procedure is one of the plurality of apparatuses retrieving the audio object from the recording medium and generating the right management information for the audio object.

According to this recording medium, the flag shows whether migration of the audio object is permitted, thereby permitting the audio object for which right management information does not exist to be migrated only once. Therefore, right management information of an audio object for which right management information has already been generated will not be duplicated. As a result, an audio object which is obtained according to check-out can be recorded on the same recording medium as an audio object which is obtained by a PD without violating the concept of copyright protection.

Here, the license management apparatus may include: a connecting unit operable to connect to a recording medium on which an audio object and a flag in correspondence with each other have been recorded; a first judgment unit operable to judge whether a migration procedure of the audio object is permitted by referring to a set value of the flag; a storage unit; and a migration procedure unit operable to perform the migration procedure only when the migration procedure is judged to be permitted by the first judgment unit. Here, the migration procedure is retrieving the audio object from the recording medium, generating right management information about the audio object, and writing the audio object and the right management information in correspondence with each other into the storage unit.

According to this license management apparatus, an audio object, which is obtained by a recording and playback apparatus performing compression coding, can be obtained without the audio object being compression coded in duplicate. As a result, the time that the license management apparatus takes to obtain the audio object is shortened, which improves the convenience for the user.

Here, the license management apparatus may be used with a recording and playback apparatus for performing reading from and writing to a recording medium on which (a) a first audio object for which corresponding right management information has been generated by the license management apparatus, and (b) a flag set to off are recorded. The recording and playback apparatus includes: a playback unit operable to reproduce the first audio object when a playback instruction is performed by a user; a signal receiving unit operable to receive an external audio signal when a recording instruction is performed by the user; an encoding unit operable to encode the audio signal so as to obtain a second audio object; and a writing unit operable to write the obtained second audio object and the flag set to on into the recording medium. Here, the flag shows (i) by being set to on, that a migration procedure is permitted, and (ii) by being set to off, that the migration procedure is not permitted. The migration procedure is the license management apparatus retrieving the second audio object and generating right management information about the second audio object.

Application of this recording and playback apparatus is not limited to simply reproducing audio objects which are recorded on a recording medium by check-out, but extends to backing up packaged content which is recorded on a CD. Therefore, a recording and playback apparatus having a higher product value can be provided for the market.

BRIEF DESCRIPTION OF THE DRAWINGS

These and other objects, advantages and features of the present invention will become more apparent from the following detailed description when taken in conjunction with the accompanying drawings which illustrate specific embodiments of the present invention. In the drawings:

FIG. 7 shows an operation example of the SDMI system of the first embodiment when a MPF is used;

DETAILED DESCRIPTION OF THE PREFERRED EMBODIMENTS

First Embodiment

Figure 1:
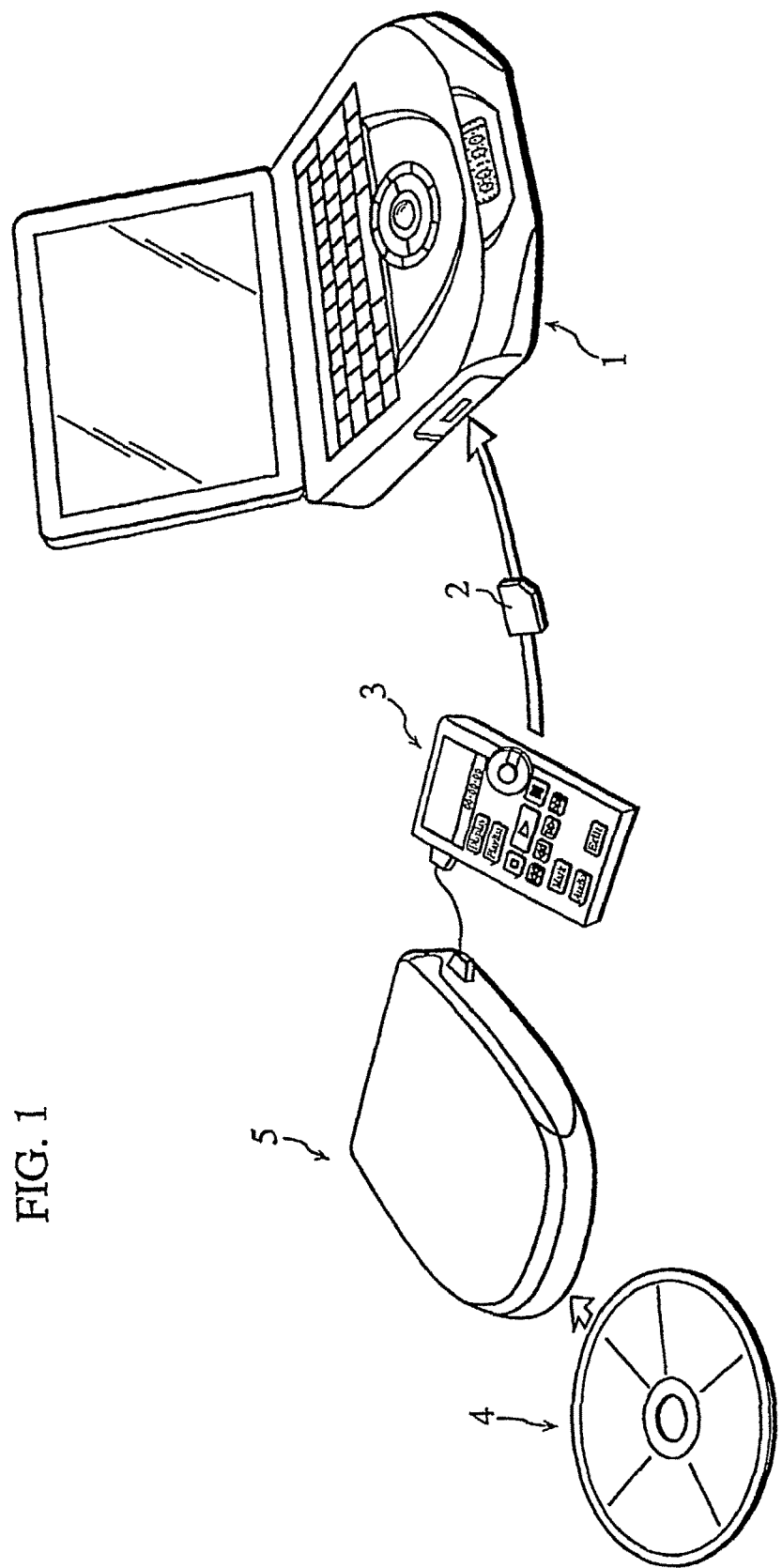
FIG. 1 shows the structure of one SDMI domain in an SDMI system.

The following explains, with reference to the drawings, a recording medium, a license management apparatus 1, and a recording and playback apparatus (recording and playback PD) of the first embodiment that are used in an SDMI system. The SDMI system includes a plurality of domains. FIG. 1 shows the structure of one SDMI domain in the SDMI system. As shown in FIG. 1, the SDMI domain includes a license management apparatus 1, an SD memory card 2, a recording and playback PD 3 (hereinafter "rec/play PD 3"), a CD 4, and a CD player 5.

Figure 4:
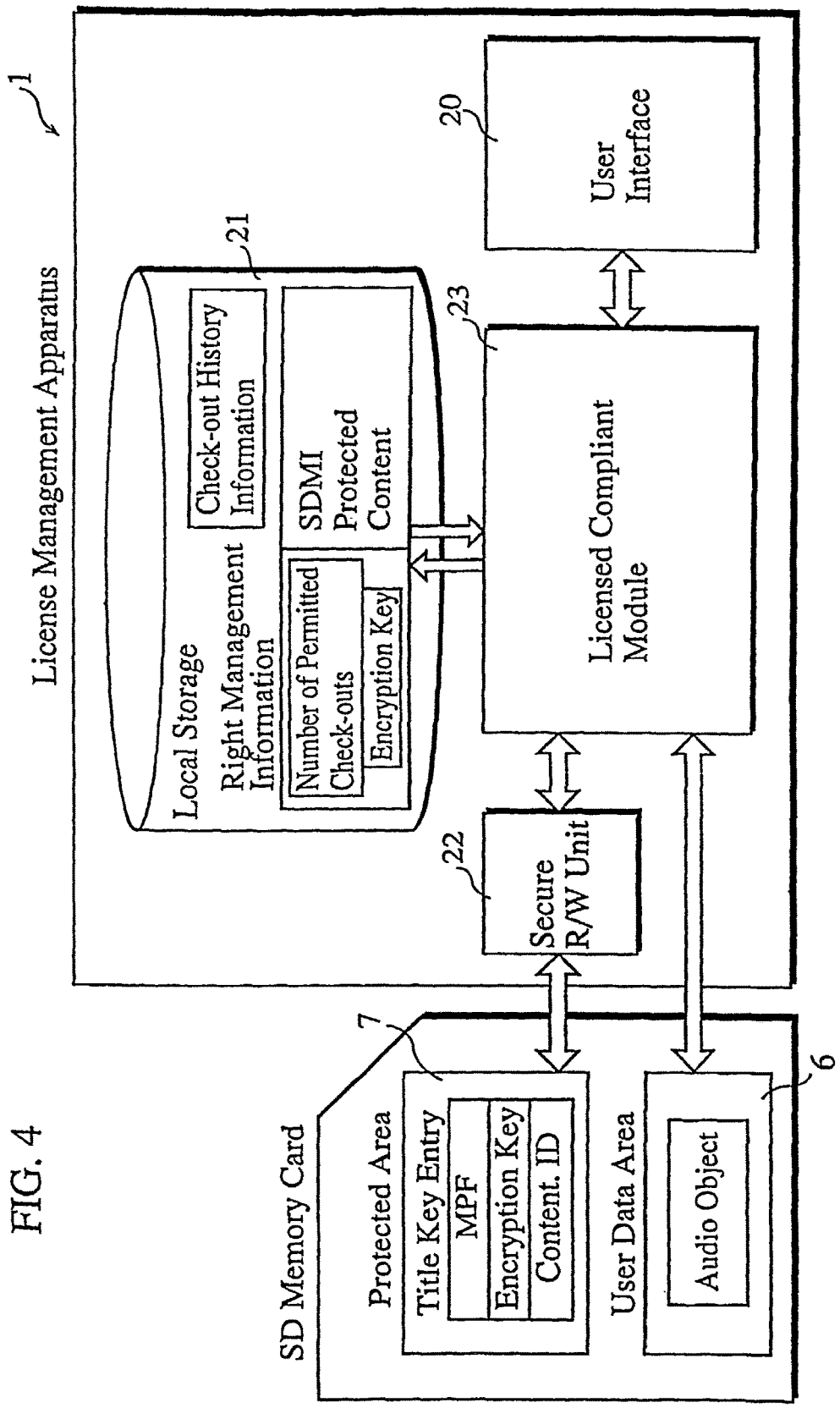
FIG. 4 shows the internal structure of the license management apparatus 1.

With reference to FIG. 4, the license management apparatus 1 is composed of a local storage 21 which can store a plurality of sets of SDMI protected content and right management information (hereinafter "RMI"), and a LCM (licensed complaint module) 23. The license management apparatus 1 performs check-in and check-out. In check-out, the license management apparatus 1 writes an audio object into/onto the SD memory card 2. In check-in, the license management apparatus 1 returns an audio object to the local storage 21. The SDMI protected content is encrypted audio data that only an LCM 23 can reproduce. An encryption key for decrypting the audio data is stored in the RMI. The RMI is encrypted according to a public key encryption method, and can only be decrypted by the LCM 23. In the SDMI domain, the rec/play PD 3, which is not equipped with LCM 23, cannot retrieve the encryption key from the RMI. Consequently, in the SDMI domain, the SDMI protected content is treated as audio data which can only be reproduced in the LCM 23. On the other hand, the audio object (hereinafter "AOB") is encrypted audio data which is written into the SD memory card 2 together with the encryption key, and can be reproduced by a device belonging to the SDMI domain.

Figure 2:
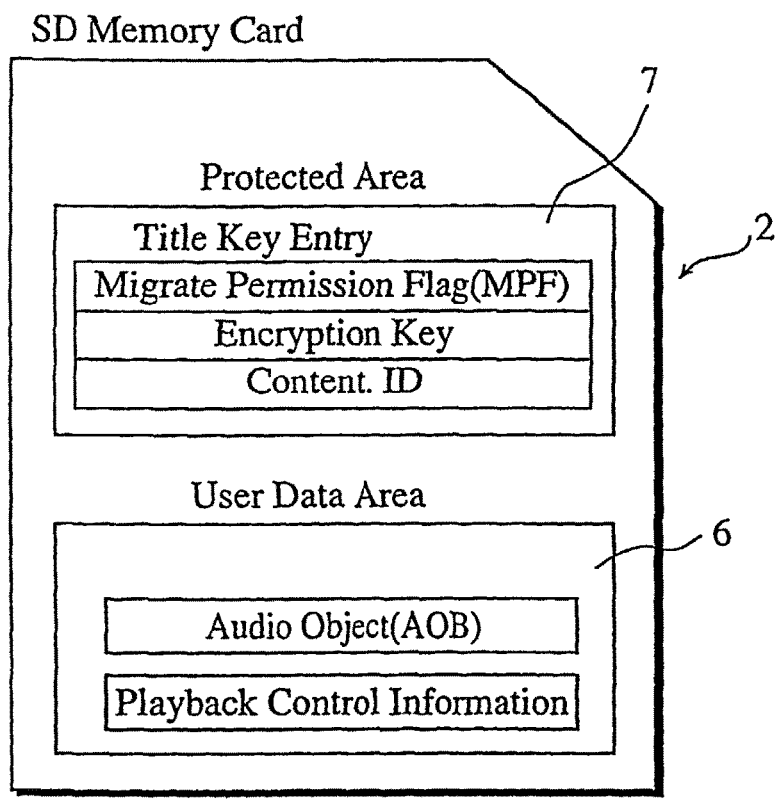
FIG. 2 shows the internal structure of the SD memory card 2.

The SD memory card 2 is a recording medium into which a unique identifier (hereinafter "media ID") for identifying the individual recording medium is written. As shown in FIG. 2, the SD memory card 2 is composed of a protected area 7 which can be accessed only by devices in the system which are accepted as being authentic (the license management apparatus 1, and the rec/play PD 3), and a user data area 6 which can be accessed not only by authentic devices, but also by devices that are not authentic.

The rec/play PD 3 does not have the local storage 21 nor the LCM 23, and is a PD which reproduces AOBs that are written into/onto the SD memory card 2, and which writes AOBs into/onto the SD memory card 2. The rec/play PD 3 obtains audio data from an audio signal which is generated by the CD player 5 reproducing a CD, encrypts the audio data and writes the encrypted audio data into/onto the SD memory card 2 as an AOB.

The CD 4 is a recording medium on which a packaged content is recorded. A packaged content recorded on the CD 4 can be content which is copyright protected according to SDMI that has a watermark, or content which is produced before the application of copyright protection that does not have a watermark (generally called a "legacy content").

The CD player 5 reproduces a packaged content that is recorded on the CD 4, and outputs an audio signal to the rec/play PD 3. There are two types of audio signals that may be output from the CD player 5: IEC 958 digital signals (unprotected digital signals), and analog signals.

The characteristics of the above-described system are the rec/play PD 3 performing compression coding of an audio signal from the CD player 5 and writing the obtained AOB into/onto the SD memory card 2, and the license management apparatus 1 retrieving the AOB from the SD memory card 2.

This completes the explanation of the SDMI system. Next, the internal structure of the SD memory card 2 will be explained. FIG. 2 shows the internal structure of the SD memory card 2. The SD memory card 2 shown in FIG. 2 is composed of a user data area 6 and a protected area 7.

At least one AOB and a corresponding piece of playback control information are written into the user data area 6. A title key entry (hereinafter "TKE") corresponding to each AOB is written into the protected area 7. The TKE includes the encryption key which is used to encrypt the AOB, a content ID which is an identifier for identifying the SDMI protected content that corresponds to the AOB, and a migrate permission flag (hereinafter "MPF"). The MPF, when set to "off", shows that the AOB corresponding to the TKE was written according to check-out by one license management apparatus 1 of a plurality of license management apparatuses, and that migration is not permitted to any of the plurality of license management apparatuses. The MPF, when set to "on", shows that the AOB corresponding to the TKE was written by the PD 3, and migration to any of the license management apparatuses is permitted. In the first embodiment, "off" is shown by "0", and "on" is shown by "1". The set consisting of the above-described AOB, the corresponding TKE, and the playback control information is called a "track".

Figure 3:
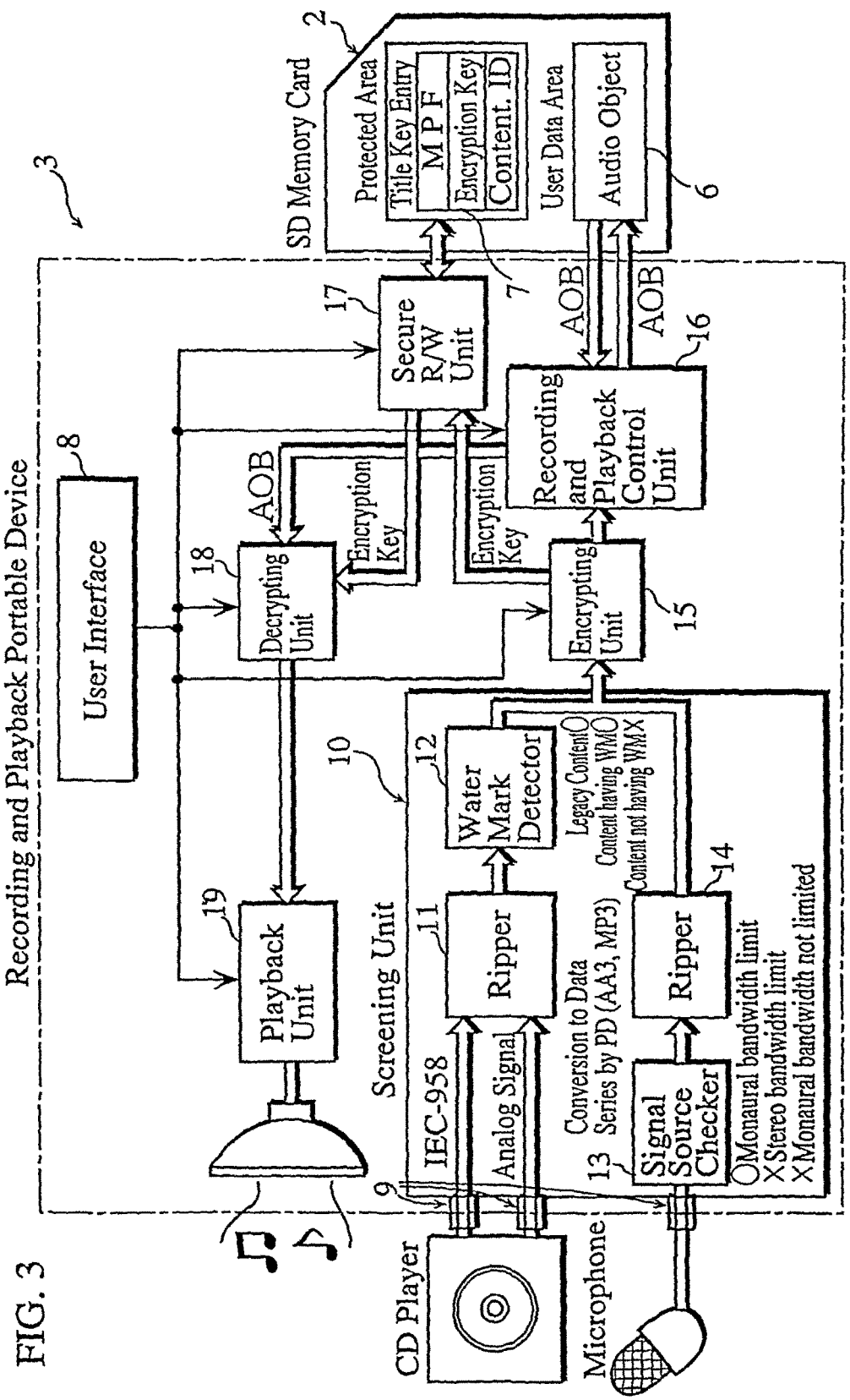
FIG. 3 shows the internal structure of the recording and playback PD 3.

This completes the explanation of the SD memory card 2. Next, the internal structure of the rec/play PD 3 will be explained. FIG. 3 shows the internal structure of the rec/play PD 3. As shown in FIG. 3, the rec/play PD 3 is composed of a connector with which connection to the SD memory card 2 is possible. The rec/play PD 3 also includes a user interface 8, signal input terminals 9, a screening unit 10 (which includes a ripper 11, a watermark detector 12, a signal source checker 13, and a ripper 14), an encrypting unit 15, a recording and playback control unit 16, a secure R/W unit 17, a decrypting unit 18, and a playback unit 19.

The user interface 8 is composed of a display, a key pad, and so on. The user interface 8 receives instructions from the user to write into/onto and reproduce from the SD memory card 2, and instructs control by the encrypting unit 15, the recording and playback control unit 16, the secure R/W 17, the decrypting unit 18, and the playback unit 19, according to these instructions.

The signal input terminal 9 is an input terminal which brings external audio signals into the recording and playback PD 3. There is an analog stereo type terminal, an unprotected digital type terminal, and an analog monaural type terminal. The CD player 5 is connected to the analog stereo type input terminal or the unprotected digital type input terminal, while a microphone is connected to the analog monaural type input terminal.

The screening unit 10 prevents illegal compression coding of audio signals which are input via the signal input terminals 9, and also converts audio signals into audio data. The screening unit 10 includes a ripper 11, a watermark detector 12, a signal source checker 13, and a ripper 14.

The ripper 11 compression codes analog signals or unprotected digital signals so as to obtain audio data. Analog signals or unprotected digital signals are successively input via the signal input terminals 9, the analog stereo type input terminal and the unprotected digital terminal. The compression coding is based on, for instance, MP3 (MPEG1 layer 3), MPEG-AAC (Advanced Audio Coding), or WMA (Windows Media Audio).

The watermark detector 12 detects a watermark from the audio data that is output from the ripper 11. The audio data that is output by the ripper 11 is obtained by compression coding a packaged content which is copyright protected. When a watermark is detected, the watermark detector 12 removes the watermark from the audio data, and then outputs the watermark-removed audio data to the encrypting unit 15. Audio data which is copyright protected but which does not have a watermark is not output to the encrypting unit 15. This is because it is assumed that the fact that there is no watermark, despite being copyright protected, means that the audio data has passed through the screening unit 10 in the past and the watermark has already been removed, and also because outputting such audio data to the encrypting unit 15 would mean generating the audio data in duplicate.

However, when audio data that is output from the ripper 11 corresponds to packaged content which is not copyright protected (legacy content), regardless of not detecting a watermark, the watermark detector 12 outputs the audio data to the encrypting unit 15. According to this, a legacy content can be retrieved by the rec/play PD 3 even if a watermark does not exist.

The signal source checker 13 judges the authenticity of audio signals which are input into the rec/play PD 3 through the analog monaural type input terminal. In detail, the signal source checker 13 judges whether an input audio signal is monaural and has a bandwidth limitation. If the judgement is affirmative, the signal source checker 13 outputs the audio signal to the ripper 14. If the input audio signal is of the stereo type, or is monaural but does not have a bandwidth limitation, the signal source checker 13 assumes that a microphone is improperly connected to the signal input terminal 9 and does not output the audio signal to the ripper 14.

The ripper 14, which has the same structure as the ripper 11, compression codes analog signals which are output by the signal source checker 13, and outputs the signals to the encrypting unit 15.

The encrypting unit 15, when a recording operation is performed on the user interface 8 and when audio data is output from the ripper 14 or the watermark detector 12, generates a unique encryption key for the audio data, and encrypts the audio data by using the encryption key so as to generate encrypted data.

The recording and playback control unit 16, when a recording operation is performed on the user interface 8 and when encrypted audio data is output from the encrypting unit 15, writes the output encrypted audio data into the user data area 6 as an AOB. When a playback operation is performed on the user interface 8, the recording and playback control unit 16 reads the AOB from the user data area 6 of the SD memory card 2, and outputs the AOB to the decrypting unit 18.

The secure R/W unit 17, when a recording operation is performed on the user interface 8 and when an encryption key is output from the encrypting unit 15, writes a TKE into the protected area 7. The TKE includes the output encryption key, a MPF set to "1", and a content ID uniquely identifying the AOB in the SD memory card 2. Furthermore, when a playback operation is performed on the user interface 8, the secure R/W unit 17 reads the TKE from the protected area 7, and sets the encryption key stored in the TKE in the decrypting unit 18 as the encryption key to be used in playback.

The decrypting unit 18, when a recording operation is performed on the user interface 8 and when an AOB is output from the recording and playback control unit 16, decrypts the AOB by using the encryption key which is output from the secure R/W unit 17, and outputs the audio data to the playback unit 19.

The playback unit 19 reproduces the audio data output from the decrypting unit 18.

This completes the explanation of the rec/play PD 3. Next, the internal structure of the license management apparatus 1 will be explained. FIG. 4 shows the internal structure of the license management apparatus 1. As shown in FIG. 4, the license management apparatus 1 has a connector for connecting to the SD memory card 2, and is composed of a user interface 20, a local storage 21, a secure R/W unit 22, and a licensed compliant module (LCM) 23.

The user interface 20 is composed of a display, a keyboard, a mouse, and so on, and receives an operation instructing an AOB to be retrieved from the SD memory card 2, and an operation instructing check-out to the SD memory card 2. In the retrieving operation, the user interface 20 displays a list of all AOBs which are written in the SD memory card 2, and receives a specification, according to a drag operation, of the AOB to be retrieved. In the check-out operation, the user interface 20 displays all AOBs which are stored in the local storage 21, and, as with the retrieving operation, receives a specification of the AOB to be retrieved, according to a drag operation.

The local storage 21 is an internal disk apparatus which can store a plurality of sets of SDMI protected content and RMI. For content from among the SDMI protected content which has been checked-out at least once, the number of permitted check-outs is decremented, and check-out history information is put in correspondence with the content. The check-out history information is the set of the media ID assigned to the SD memory card 2 on which the AOB is written in check-out, and the content ID which uniquely specifies the SDMI protected content in the SD memory card 2. The check-out history information is used when the LCM 23 performs check-in.

The secure R/W unit 22, when instructed to retrieve from the SD memory card 2, reads the TKE from the protected area 7, and outputs the TKE to the LCM 23. If check-out is instructed, the secure R/W unit 22 writes the TKE into the protected area 7.

The LCM 23, when instructed to perform data retrieving from the SD memory card 2, performs check-in and migration alternatively. When check-out is instructed, the LCM 23 performs check-out. When retrieving, the LCM 23 gives priority to judging whether or not migration is permitted, ahead of whether or not check-in is permitted. The procedures of the licensed compliant module 23 in migration, check-in, and check-out are explained in the following, divided into (i), (ii), and (iii).

(i) When the SD memory card 2 is connected and an operation to retrieve from the SD memory card 2 is performed on the user interface 20, the LCM 23 judges whether migration is permitted. In order to do this, the LCM 23 first retrieves the TKE from the protected area 7, and judges whether the MPF is set to "1" or "0". If the MPF is set to "1", the LCM 23 performs the migration procedure. In the migration procedure, the LCM 23 retrieves the AOB from the user data area 6 of the SD memory card 2, and stores the AOB as SDMI protected content in the local storage 21. In addition, the LCM 23 also retrieves the encryption key from the protected area 7 via the secure R/W unit 22, generates RMI which includes the encryption key, and stores the generated RMI in the local storage 21. The result of the above-described process is that the AOB which is written in the SD memory card 2 is managed in the local storage 21 as SDMI protected content. Next, the LCM 23 overwrites the content ID and the MPF with "0", and overwrites the encryption key in the TKE in the SD memory card 2 with a random number. Overwriting the encryption key with a random number means that the AOB corresponding to the encryption key is put in a non-reproduction state.

(ii) Check-in is performed only when the LCM 23 judges that migration is not to be permitted. In other words, when the MPF is set to "0", the LCM 23 retrieves the content ID from the TKE, retrieves the media ID, and judges whether check-out history information matching the set of the media ID and the content ID exists in the local storage 21. If such matching check-out history information does not exist, the LCM 23 judges that check-out was performed in another license management apparatus and does not execute check-in. If such matching check-out history information exists, the LCM 23 judges that the license management apparatus 1 performed check-out, and the LCM executes check-in. In check-in, the LCM 23 may move the AOB and the encryption key from the SD memory card 2 to the local storage 21, but in this case, check-in takes time due to reading and writing of the AOB. Therefore, check-in is generally performed simply, in the following manner. The LCM 23 decrypts the RMI of the SDMI protected content which corresponds to the check-out history information, reads the number of permitted check-outs, and after incrementing the number of permitted check-outs, re-encrypts the RMI. In addition, the LCM 23 also overwrites the MPF and the content ID in the TKE with "0", and overwrites the encryption key with a random number.

(iii) If an operation to perform check-out is performed on the user interface 20, the LCM 23 decrypts the RMI which corresponds to the SDMI protected content, and retrieves the number of permitted check-outs and the encryption key. After decrementing the number of permitted check-outs, the LCM 23 writes the number back into the RMI. Then, the LCM 23 generates a TKE including the retrieved encryption key and a unique content ID, and writes the generated TKE into the protected area 7. At this time, the LCM 23 does not update the MPF, and the MPF remains set to "0". Next, the LCM 23 reads the media ID from the SD memory card 2, puts the content ID and media ID in correspondence with the TKE, and stores the content ID and the media ID in the local storage 21 as check-out history information.

Next, an operation example of the above-described system will be explained. A characteristic of the system is that when the rec/play PD 3 writes an AOB on the SD memory card 2, it also sets the MPF. Therefore, the explanation of the system will be given by comparing a case in which an AOB is written into the SD memory card 2 without a MPF being set, and a case in which an AOB is written into the SD memory card 2 with a MPF being set.

Figure 5:
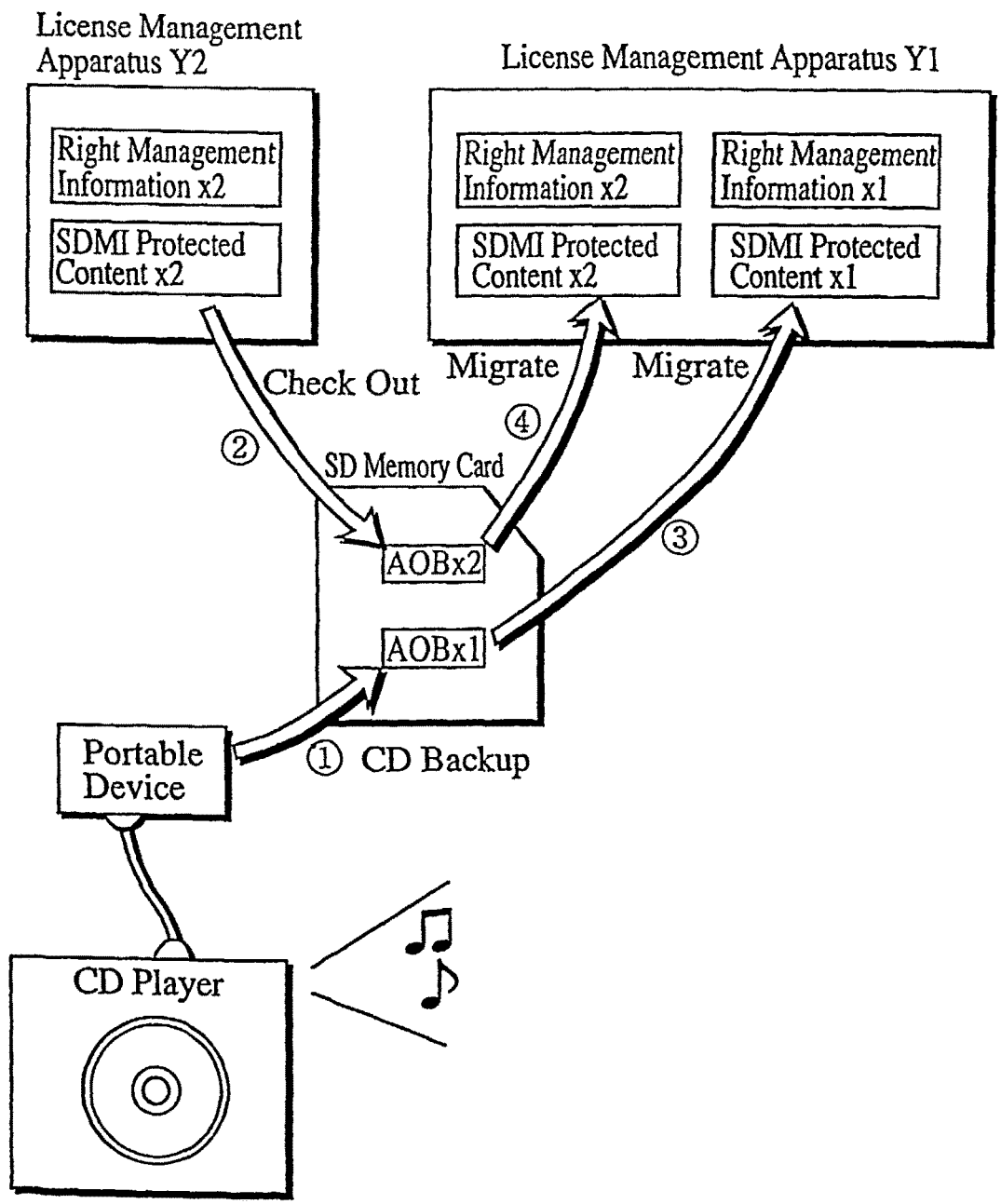
FIG. 5 shows an operation example of the SDMI system of the first embodiment when migration is performed without using a migration permission flag (MPF)

First, an operation example of the case in which the MPF is not written will be explained. FIG. 5 shows the operation example of when migration is performed without using a MPF. In the present system, the CD player 5 starts to reproduce a packaged content which is recorded on a CD, the rec/play PD 3 obtains an AOBx1 by compression coding the playback signal, and writes the AOBx1 into the SD memory card 2 without a corresponding MPF, as shown by ①. On the other hand, if a license management apparatus Y2 writes an AOBx2 into the SD memory card 2 by performing check-out of the SDMI protected content x2 which is inside the license management apparatus Y2 itself, as shown by ②, the result is that there is no way of distinguishing the AOB which is written by the rec/play PD 3 from the AOB which is written by the license management apparatus Y2. If the SD memory card 2 on which the AOBs are written is connected to the license management apparatus Y1, as shown by ③ and ④, SDMI protected content x1 and x2 respectively corresponding to the AOBx1 and the AOBx2 and the corresponding RMI x1 and RMI x2 will be generated in the license management apparatus Y1. The AOB x2 already has RMI x2 in the license management apparatus Y2, and RMI x2 is also generated in the license management apparatus Y1, meaning that the rights of the AOB x2 are managed twice.

Figure 6:
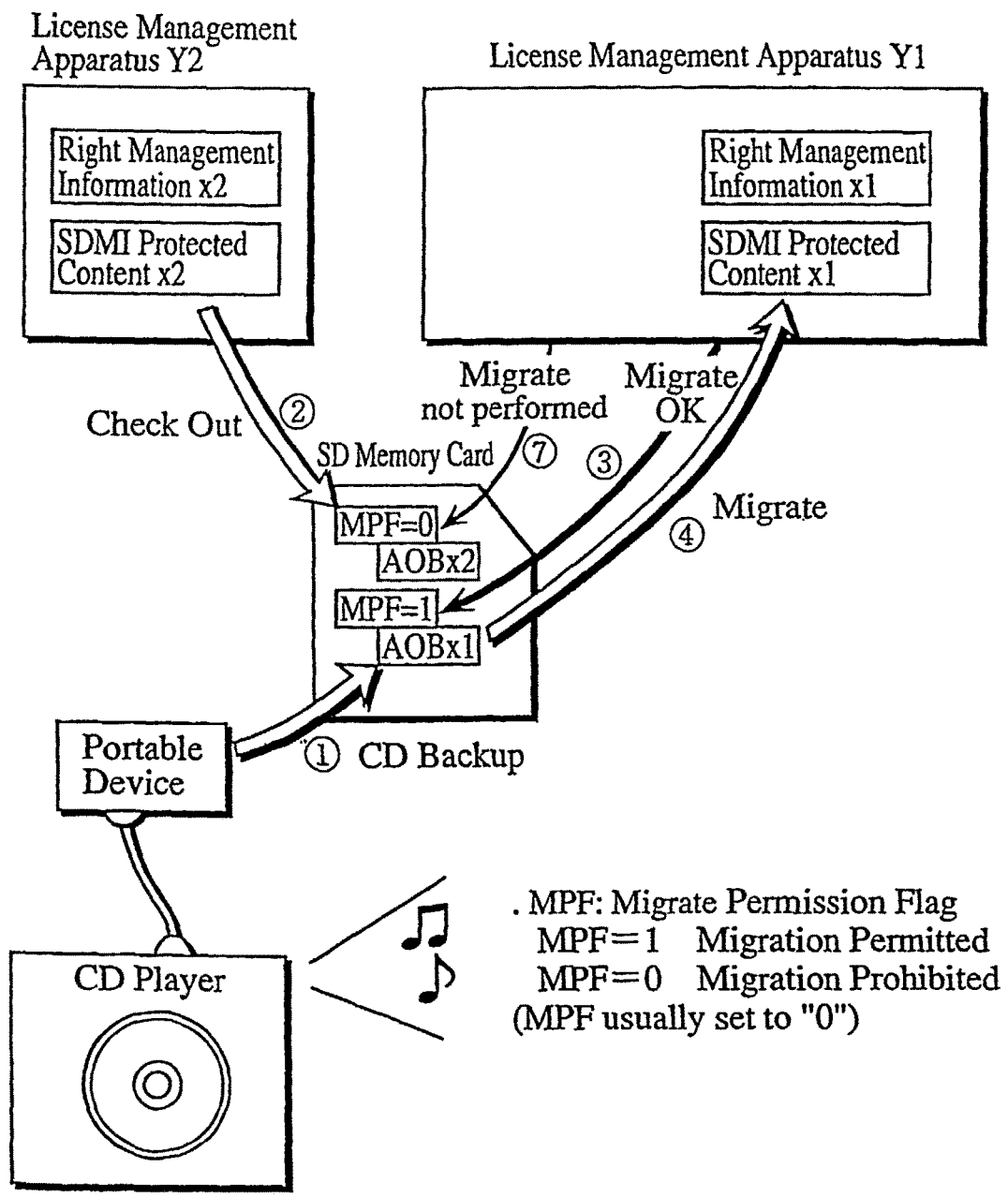
FIG. 6 shows an operation example of the SDMI system of the first embodiment when migration is performed by using a migration permission flag.

Next, an operation example of the license management apparatus 1 performing a migration procedure by using a MPF when the PD makes a backup of the CD will be explained. FIG. 6 and FIG. 7 show operation examples of when a MPF is used. In FIG. 6, when the CD player 5 reproduces a CD, and the rec/play PD 3 compression codes the audio signal that is output from the CD player 5 and obtains an AOB, the MPF is set to "1" and the AOBx1 is written in correspondence with the MPF on the SD memory card 2, as shown by ①. On the other hand, when the license management apparatus Y2 performs check-out, the license management apparatus Y2 does not set the MPF, and the AOB is written as is. As a result, the AOB written according to the license management apparatus Y2 performing check-out is stored in correspondence with a MPF set to "0" in the SD memory card 2. If the SD memory card 2 in which the AOBx1 and the AOBx2 are stored is connected to the license management apparatus Y1, the license management apparatus Y1 refers to the MPF for each AOB, as shown by ③, and judges whether a migration procedure should be performed. The license management apparatus Y1 judges that a migration procedure for the AOB x1 is permitted because the migration permission flag is set to "1". Subsequently, the license management apparatus Y1 generates RMI x1 for the AOB x1 as shown by ④, and performs the migration procedure by reading the AOB x1 into the local storage 21 as an SDMI protected content x1. Next, as shown by ⑤ in FIG. 7, the MPF is updated to "0", and the AOB x1 is put into a non-reproduction state, as shown by ⑥. Meanwhile, the license management apparatus Y1 refers to the MPF for the AOBx2 and judges whether the AOB x2 is permitted to be migrated. The MPF is set to "0", and as a result, the license permission apparatus Y1 aborts the migration procedure. According to this, a duplicate generation of RMI for an AOB for which there is already an RMI is avoided.

Figure 8:
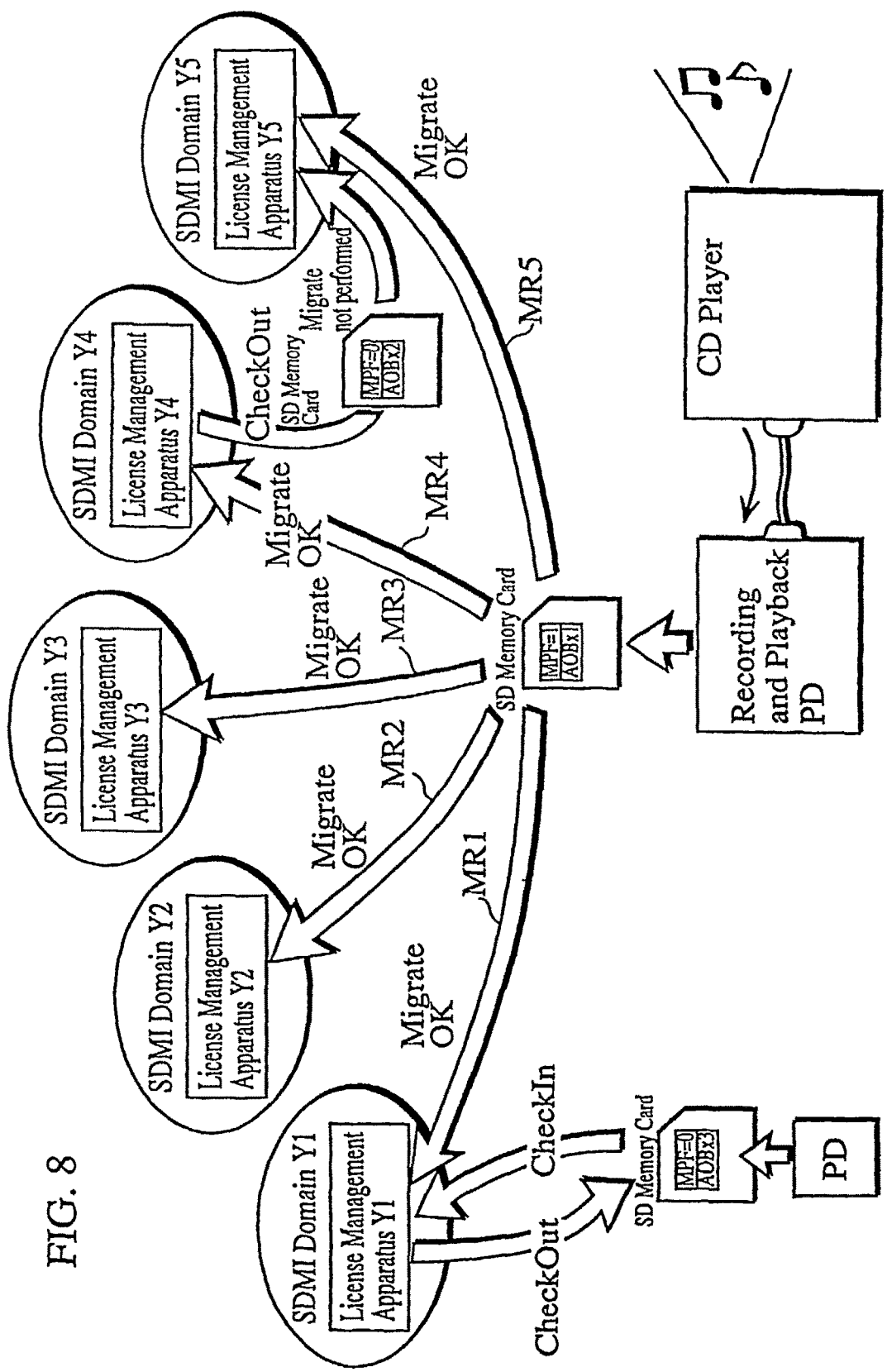
FIG. 8 shows an operation example of how migration of an AOB (audio object) is performed when the recording and playback PD of one of the SDMI domains in a plurality of SDMI domains writes the AOB on the SD memory card 2.

Next, the way an AOB is migrated when a rec/play PD 3 in one SDMI domain of a plurality of SDMI domains writes the AOB into the SD memory card 2 will be explained. In an example in FIG. 8, there are a plurality of SDMI domains: Y1, Y2, Y3, Y4, and Y5. When a rec/play PD 3 which is included in one of the SDMI domains writes the AOBx1 in correspondence with the MPF set to "1" on the SD memory card 2, it is possible to execute migration of the AOB x1 to any of the plurality of license management apparatuses Y1, Y2, Y3, Y4, and Y5, as shown by arrows MR1, MR2, MR3, MR4, and MR5. In other words, the AOB x1, which was written by the rec/play PD 3, can be migrated by an SDMI domain license management apparatus of any of the SDMI domains Y1, Y2, Y3, Y4, and Y5. However, if migration of the AOB x1 is performed once, the AOB x1 is put into a non-reproduction state, and migration cannot be performed a second time. Furthermore, even if the license management apparatus which is included in one SDMI domain Y4 writes the AOB x2 into the SD memory card 2 by performing a check-out, another license management apparatus Y5 will not execute migration of the AOB x2 in any case. This is because the AOB x2 is written in the SD memory card 2 in correspondence with the MPF set to "0", and therefore, the AOB x2 is clearly distinguished from the AOB x1 which is written by the rec/play PD 3. The use of an AOB which is written by a check-out by the license management apparatus Y1 is limited, such as an AOB x3 which is written according to a check-out of the license management apparatus 1, to playback by a PD.

As explained above, according to the first embodiment, a MPF shows whether or not migration of an AOB is permitted. As a result, migration is permitted only once for an AOB for which a RMI does not exist. Accordingly, RMI is not generated in duplicate for an AOB for which a RMI already exists. This means that an AOB which is obtained by check-out and an AOB which is obtained from a PD can be written on the same recording medium without infringing the protection of copyright.

Second Embodiment

The second embodiment of the present invention relates to an improvement in data structure based on SD Audio specifications when storing and processing a TKE and an AOB.

Figure 9:
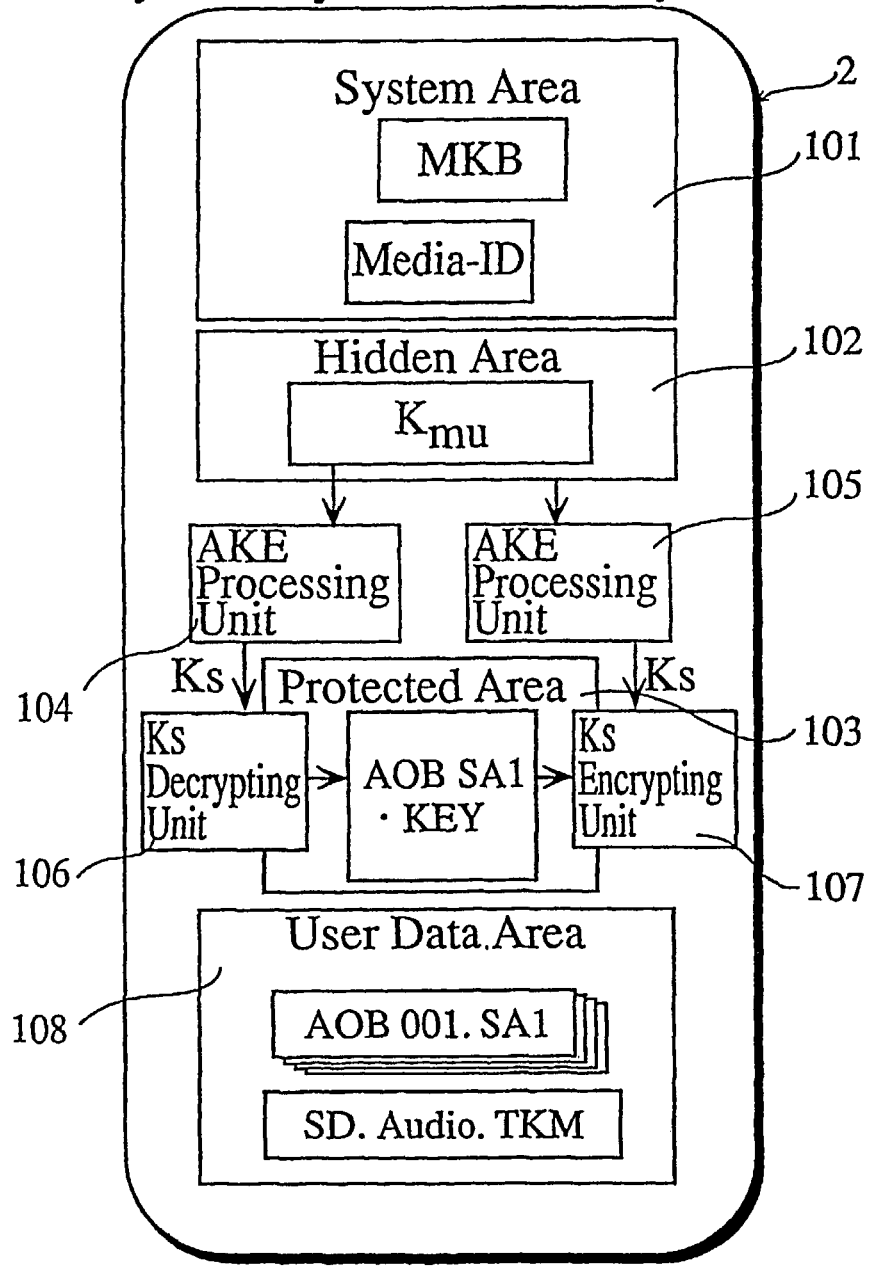
FIG. 9 shows the structure of the physical layer of the SD memory card 2.

The SD memory card 2 in the second embodiment is assumed to have a physical structure as that shown in FIG. 9.

FIG. 9 shows the structure of the physical layer of the SD memory card 2. As shown in FIG. 9, the physical layer of the SD memory card 2 is composed of a system area 101, a hidden area 102, a protected area 103, AKE processing units 104 and 105, a Ks decrypting unit 106, a Ks encrypting unit 107, and a user data area 108. Comparing the internal structure of the SD memory card 2 shown in FIG. 9 with that shown in FIG. 2, the user data area 108 and the protected area 103 in FIG. 9 correspond to the user data area 6 and the protected area 7 in FIG. 2, respectively.

The system area 101 is a read-only area storing a media key block (MKB) and a media ID. The MKB and media ID stored in this area cannot be overwritten. Suppose that the SD memory card 2 is connected to another device such as the rec/play PD 3 or the license management apparatus 1, and the MKB and media ID are read by that device. If the connected device correctly performs a specified calculation by using a device key Kd held internally, the connected device can obtain a correct encryption key Kmu.

The hidden area 102 stores the encryption key Kmu having the correct value, in other words, the encryption key Kmu that should be obtained if the connected device performs the correct calculation by using the correct device key Kd.

The protected area 103 stores a file (AOBSA1.KEY in FIG. 9) which writes a plurality of TKEs.

The AKE (authentication and key exchange) processing units 104 and 105 perform mutual authentication between a connected device and the SD memory card 2 by using the challenge-response method, verify the authenticity of the opposing device, and stop processing if the opposing device is invalid. If the opposing device is valid, however, an encryption key (session key Ks) is shared by the device and the SD memory card 2. The authentication performed by the device which is connected to the SD memory card 2 has three phases. First, in a first challenge phase, the device generates a random number, encrypts the random number by using the encryption key Kmu, and transmits the encrypted random number to the SD memory card 2 as a challenge value A. Then, in a first response phase, the SD memory card 2 uses the encryption key Kmu, which is stored internally, to decrypt the challenge value A, and transmits the decrypted value to the connected device as a response value B. Following this, in a first verify phase, the connected device decrypts the challenge value A held internally by using its encryption key Kmu, and compares the decrypted value with the response value B that is transmitted from the SD memory card 2.

The authentication performed by the SD memory card 2 also has three phases. First, in a second challenge phase, the SD memory card 2 generates a random number, encrypts the random number by using the encryption key Kmu, and transmits the encrypted random number to the connected device as a challenge value C. Then, in a second response phase, the connected device uses the encryption key Kmu stored internally to decrypt the challenge value C, and transmits the decrypted value to the SD memory card 2 as a response value D. Following this, in a second verify phase, the SD memory card 2 decrypts the challenge value C held internally by using its encryption key Kmu, and compares the decrypted value with the response value D that is transmitted from the connected device.

If the connected device uses an improper encryption key Kmu to perform mutual authentication, the challenge value A and the response value B in the first verify phase and the challenge value C and the response value D in the second verify phase will be judged to be non-matching values, and mutual authentication will be stopped. If the authenticity of the opposing devices is verified, however, the AKE processing units 104 and 105 calculate an exclusive OR of the challenge value A and the challenge value C and obtain the session key Ks by decrypting the exclusive OR by using the encryption key Kmu.

When an encrypted TKE that is to be written into the protected area 107 is output from another device which is connected to the SD memory card 2, the Ks decrypting unit 106 supposes that the TKE has been encrypted by using the session key Ks, and decrypts using the session key Ks. Then, the Ks decrypting unit 106 supposes that the encryption key and the Content ID which are obtained from this decryption are the original TKE, and they are written into the protected area 103.

The Ks encrypting unit 107 receives an instruction from a device which is connected to the SD memory card 2 instructing the Ks encrypting unit 107 to read the TKE, encrypts TKE stored in the protected area 103 by using the session key Ks, and then outputs the encrypted TKE to the device that issued the instruction.

The user data area 108 can be accessed by a connected device regardless of whether the authenticity of that device has been verified, and stores a plurality of files which contain an encrypted AOB (AOB001.SA1 in FIG. 9) and playback control information (SD_Audio.TKM). If the encryption key read from the protected area 103 has a correct value, the encrypted AOB stored in the user data area 108 can be correctly decrypted. The reading and writing of data from the protected area 103 is performed together with decryption which is performed by the Ks decrypting unit 106 and encryption which is performed by the Ks encrypting unit 107. Therefore, the protected area 103 can usually only be accessed by a device which is connected to the SD memory card 2 when that device has successfully performed AKE processing.

Figure 10:
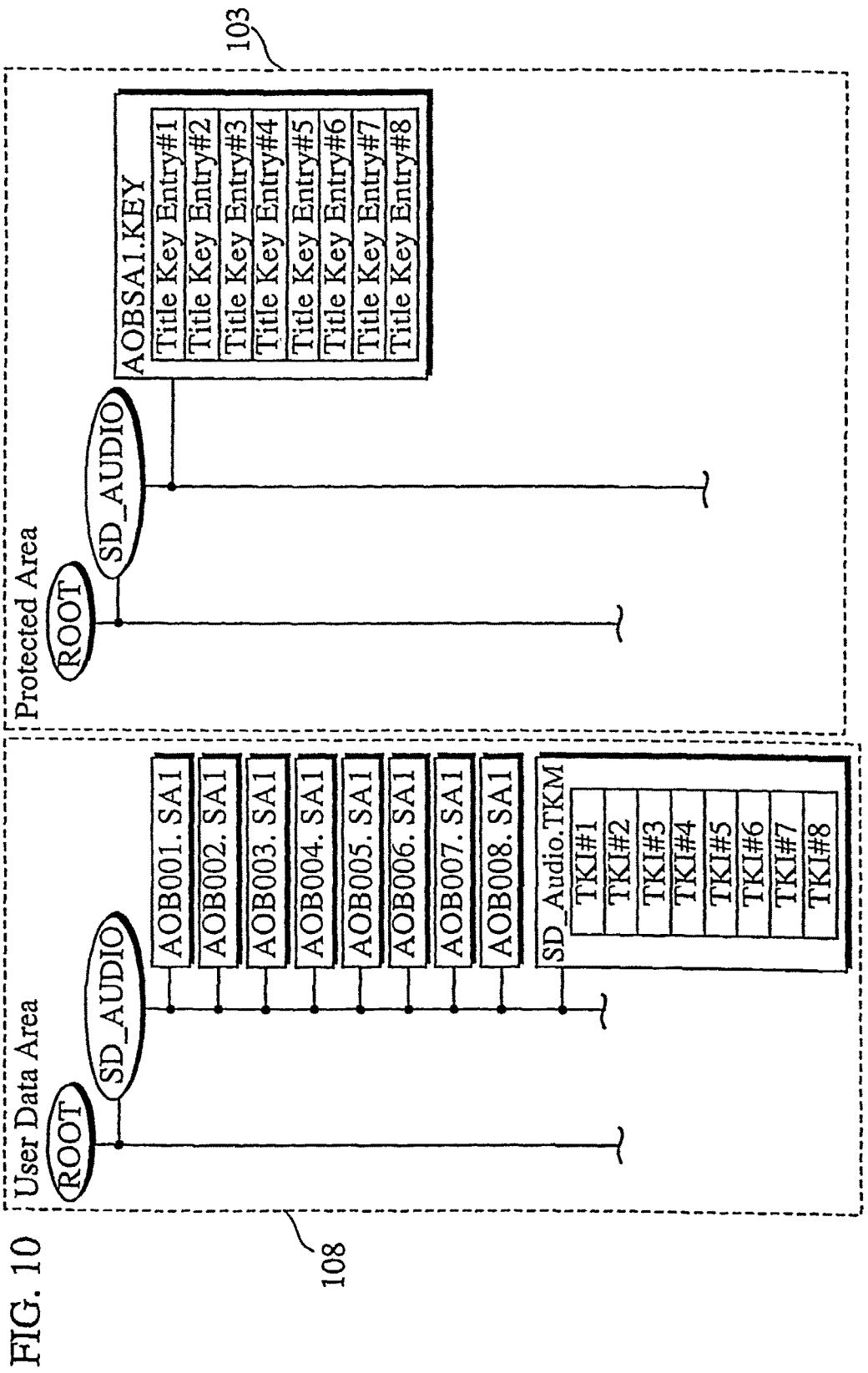
FIG. 10 shows the structure of the directories in the user data area 6 and the protected area 7 of the SD memory card 2.

Next, the structure of the directories and the files of the SD memory card 2 will be explained. FIG. 10 shows the structure of the directories and the files of the user data area 108 and the protected area 103. In FIG. 10, an SD_Audio directory is provided in both the protected area 103 and the user data area 108. The SD_Audio directory in the user data area 108 has eight AOB files (AOB001.SA1, AOB002.SA1, AOB003.SA1, AOB004.SA1 . . . AOB008.SA1), each of which stores eight AOBs and an SD_Audio.TKM, The SD_Audio directory of the protected area 103 has an AOBSA1.KEY. Numbers "001" to "008" used in the file names of the AOB files are AOB IDs. A number #1, #2, #3, #4 . . . #8 showing the same number as the AOB ID is assigned to each of the eight TKEs that are included in the AOBSA1.KEY and to the track information (TKI) included in the SD_AUDIO.TKM. An encryption key "EKEY" that is used when encrypting each AOB is stored in the TKE which has the same number as the AOB ID. Playback control information for reproducing an AOB is in the TKI which has the same number as the AOB ID.

Figure 11:
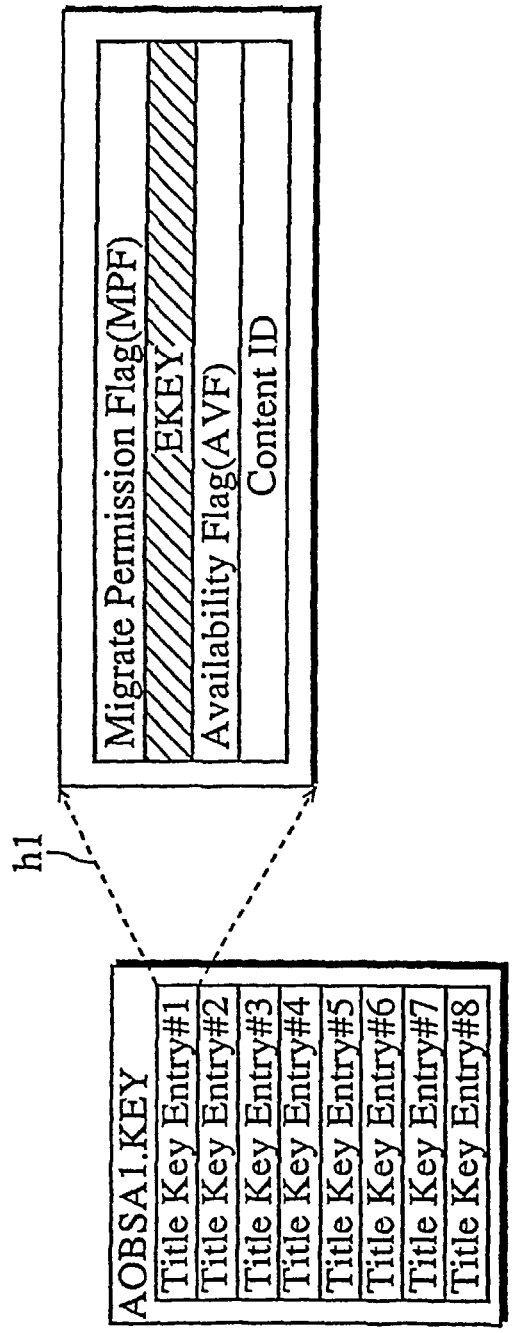
FIG. 11 shows the internal structure of the TKE (title key entry)

Next, the internal structure of a TKE will be explained. FIG. 11 shows the internal structure of a TKE. As shown by arrows h1 in FIG. 11, the TKE is composed of a MPF, a seven byte encryption key "EKEY", an AVF, and a content ID. Please note that the MPF in the second embodiment is the same as that in the first embodiment, and is only set to "1" when the AOB is written by a recording and playback PD.

The content ID in the second embodiment is used with the availability flag (hereinafter "AVF") in the following way. When there is an AOB file corresponding to a particular TKE, the content ID in the TKE is set to any of "001" to "999". When there is no AOB file corresponding to a particular TKE, the content ID is set to "000". In addition, when an AOB corresponds to a number of TKEs, the content IDs in the TKEs corresponding to the AOB are all set to the same value. When a TKE and an AOB have a one-to-one correspondence, the AVF and the MPF are set to "1". When an AOB corresponds to a number of tracks, the AVF and the MPF of the head TKE are set to "1". The AVFs and the MPFs of other TKEs are set to "0". If the content ID is not "000" and the AVF is set to "0", it is possible that a plurality of AOBs have the same content ID. Therefore, this is taken as a hint, and TKEs which have the same content ID are extracted. This means that it is possible to perform a search procedure that specifies a plurality of AOBs which correspond to the same content ID.

Figure 12:
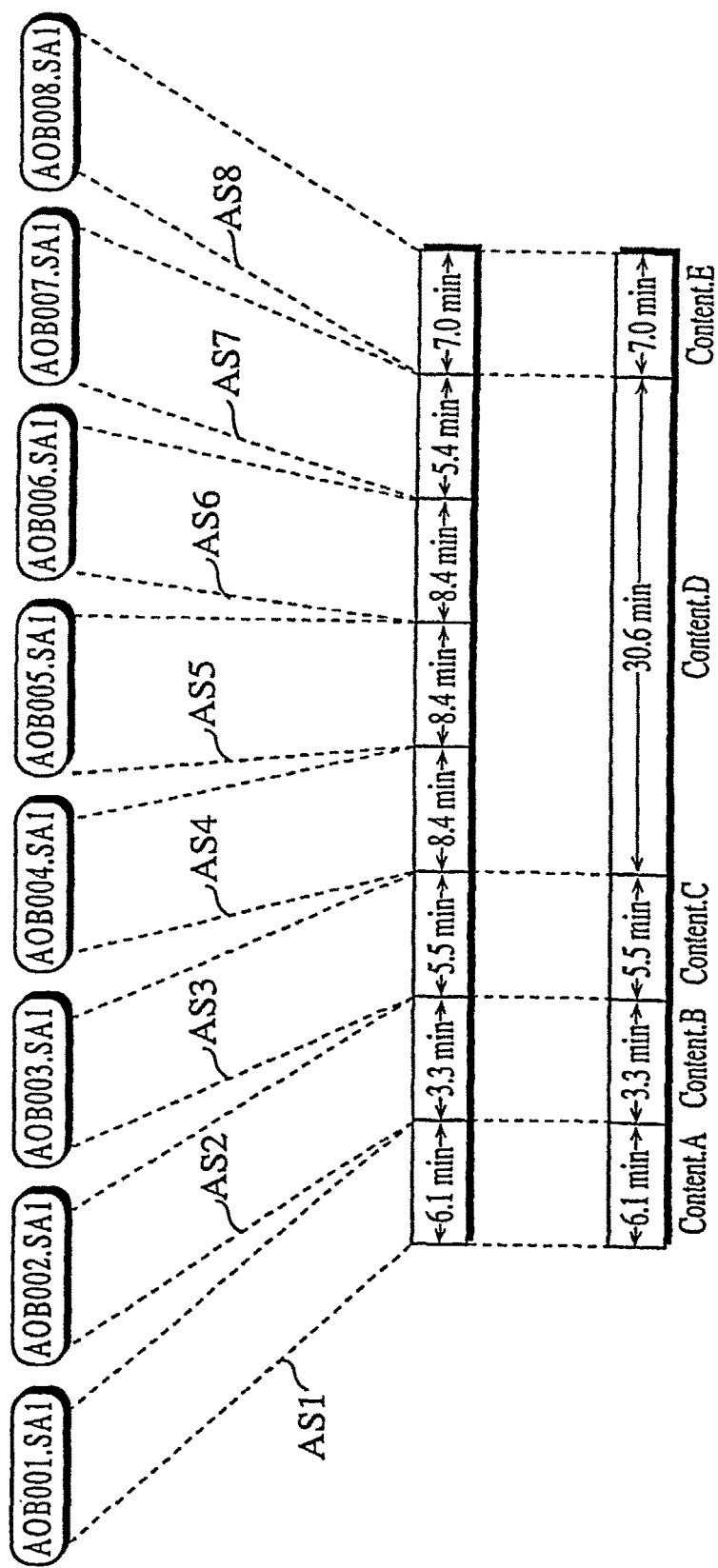
FIG. 12 shows what kind of content is reproduced when each AOB contained in an AOB file is reproduced in succession.

Next, what kind of packaged content corresponds to the eight AOBs which are written in each of the eight AOB files shown in FIG. 10 will be explained. FIG. 12 shows an example of the correlation between AOBs and packaged content.

The third row in FIG. 12 shows to what kind of packaged contents the AOBs correspond. The eight AOBs in FIG. 12 correspond to Content. A, Content. B, Content. C, Content. D, and Content. E. The second row shows the units into which the contents in the third row are divided, and the first row shows the eight AOBs which are written into the eight AOB files shown in FIG. 10. The broken lines AS1, AS2, AS3 . . . AS7, AS8 show the correlation between the sections of the content and the AOBs. There is a silent section between each of packaged content A and B, B and C, C and D, and D and E, and the AOBs in FIG. 12 are generated with these silent sections as boundaries.

AOB#4 is the head section of a content (Content. D). The Content. D has a playback time of 30.6 minutes and AOB#4 has a playback time of 8.4 minutes. AOB#5 and AOB#6 are midpoints of the Content. D, and each of AOB #5 and AOB #6 has a playback time of 8.4 minutes. AOB#7 is the last section of Content. D and has a playback time of 5.4 minutes. In this way, the content which has a playback time of 30.6 minutes is divided into units of 8.4 minutes+8.4 minutes+8.4 minutes+5.4 minutes, and is included in each AOB. As can be seen from FIG. 12, the playback time of all AOBs is kept within a time length of 8.4 minutes.

Figure 13:
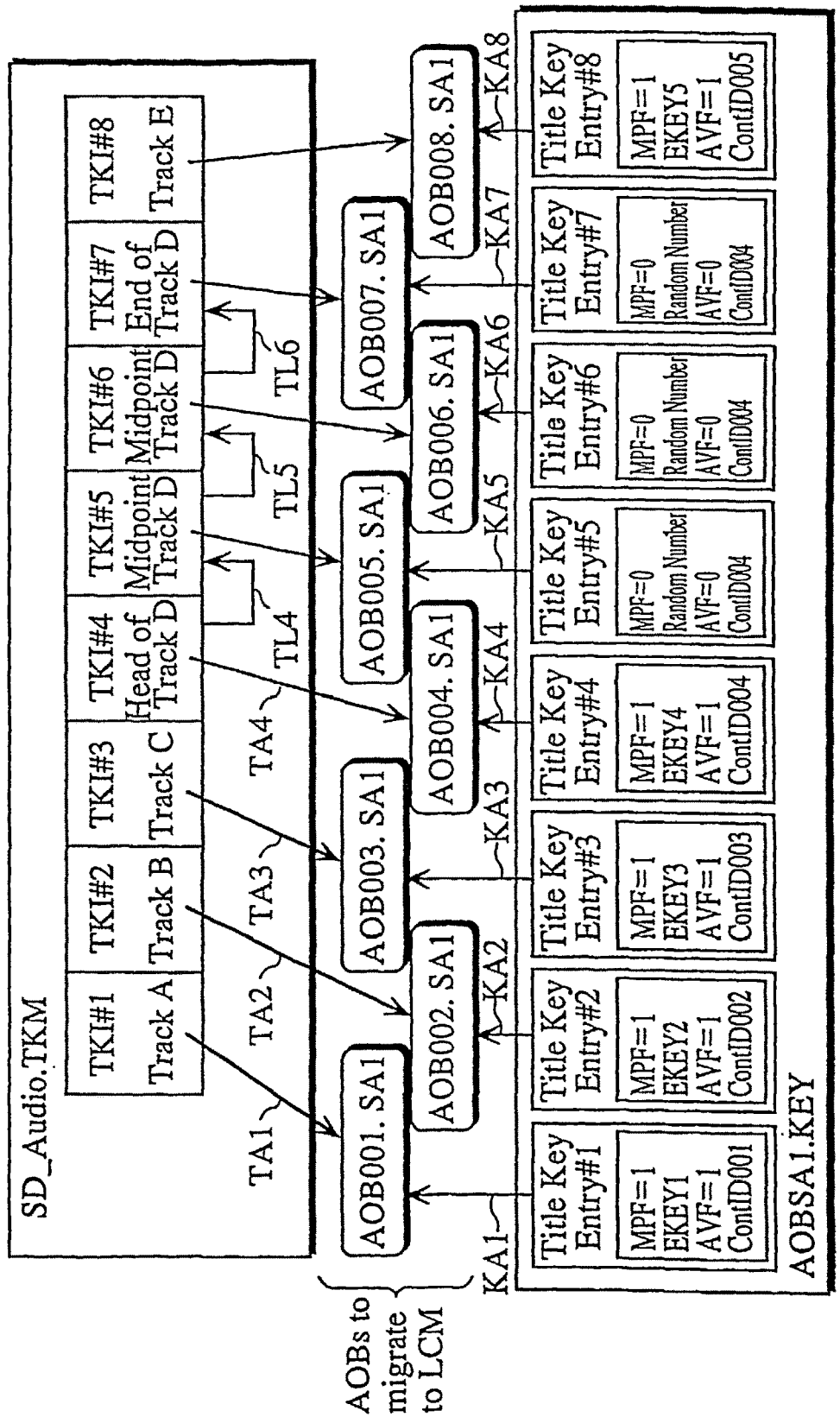
FIG. 13 shows the correlation between TKIs (track information), AOB files, and TKEs.

FIG. 13 shows the correlation between a TKI, an AOB file, and a TKE. The rectangular frame of the first row in FIG. 13 shows an SD_AUDIO.TKM, and the second and third rows show the eight AOB files shown in FIG. 10. The eight TKIs included in the SD_Audio.TKM are shown in the first row. Each TKI is assigned a number "#1", "#2", "#3", "#4" . . . "#7", "#8" which specifies the TKI, as a TKI ID. Each TKI corresponds to the AOB file whose assigned AOB ID is the same as the TKI ID number. Each TKE is given a number "#1", "#2", "#3", "#4" . . . "#7", "#8" which specifies the TKE. Each TKE corresponds to the AOB file whose AOB ID number is the same as the TKE number. Keeping this in mind and referring to FIG. 13, it can be seen that TKI#1 and TKE #1 correspond to AOB001.SA1, TKI#2 and TKE #2 correspond to AOB002.SA1, TKI#3 and TKE #3 correspond to AOB003.SA1, and TKI#4 and TKE #4 correspond to AOB004.SA1. The arrows TA1, TA2, TA3, TA4 . . . in FIG. 13 show to which AOB file each TKI corresponds. The arrows KA1, KA2, KA3, KA4 . . . show to which AOB file each TKE corresponds.

The eight boxes in the fourth row show the eight TKEs. Each of the eight TKEs stores five EKEYs (EKEY#1, EKEY#2, EKEY#3, EKEY#4, EKEY#5), five content IDs (001, 002, 003, 004, 005), eight AVFs, and eight MPFs. Of the TKEs in FIG. 13, TKEs #4 to #7, which correspond to one content, Content. D, the MPF and the AVF of TKE #4 are set to "1", and the MPFs and the AVFs of the remaining TKEs #5, #6, #7 are set to "0". Furthermore, a TKE #4 is written into only the TKE #4, while the remaining TKEs #5, #6, #7 are each overwritten with a random number.

Figure 14:
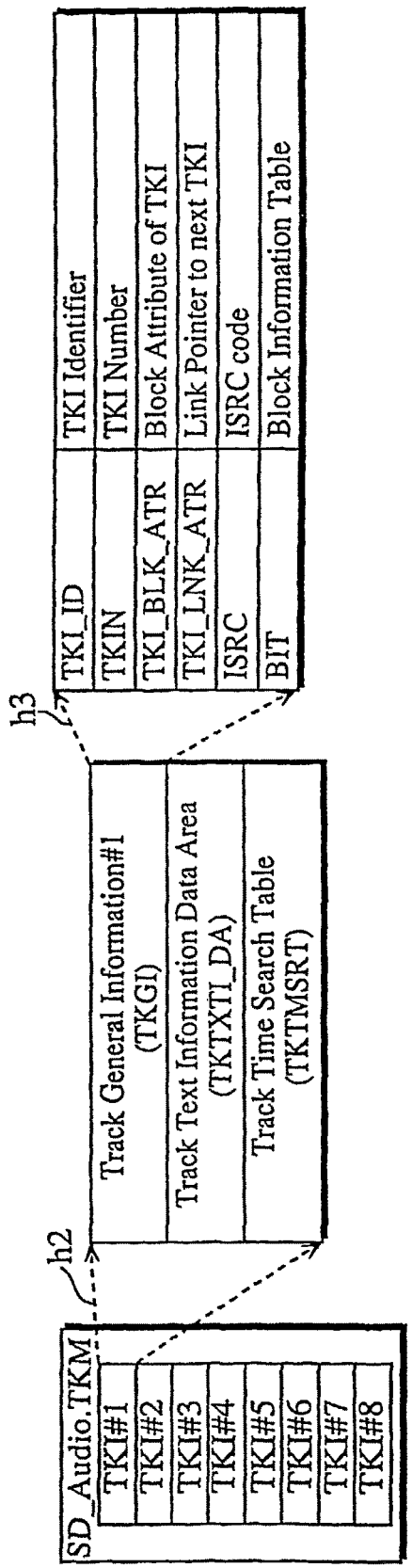
FIG. 14 shows the internal structure of a TKI.

TKIs in AOB playback control information are described below with reference to FIG. 14. Referring to FIG. 14, it can be seen that each TKI, as shown by the arrows h2, includes Track_General_Information (TKGI), a Track_Text_Information_Data_Area (TKTXTI_DA) recording text information which is unique to the TKI, such as an artist name, an album name, an arranger name, and a producer name, and a Track_Time_Search_Table (TKTMSRT) in which the playback time is restricted to 8.4 minutes.

As indicated by the arrows h3 in FIG. 14, a TKGI includes various information items (TKI_ID, TKIN, TKI_BLK_ATR, TKI_LNK_PTR, ISRC, and BIT).

An ID with which the TKI can be uniquely identified is written into TKI_ID (in this second embodiment, the ID is a 2-byte code "A4").

A TKI number in a range between 1 and 999 is written into each TKIN.

An attribute for the TKI is written into each TKI_BLK_ATR.

The following describes the settings of the TKI_BLK_ATR of each TKI in the example shown in FIG. 13. By referring to the TKI_BLK_ATR of each TKI, it can be seen that since the four pairs TKI#1/AOB001.SA1, TKI#2/AOB002.SA1, TKI#3/AOB003.SA1, and TKI#8/AOB008.SA1 each correspond to separate tracks, the TKI_BLK_ATR of each of TKI#1, TKI#2, TKI#3, and TKI#8 is set as "Track". The TLK_BLK_ATR of TKI#4 is set at "Head_of_Track", the TLK_BLK_ATR of TKI#7 is set at "End_of_Track", and the TLK_BLK_ATRs of TKI#5 and TKI#6 are set at "Midpoint_of_Track". This means that the AOB file "AOB004.SA1" corresponding to TKI#4 is the start of a track, the AOB files "AOB005.SA1" and "AOB006.SA1" corresponding to TKI#5 and TKI#6 are midpoints of the track, and the AOB file "AOB007.SA1" corresponding to TKI#7 is the end of the track.

TKI_BLK_ATR can be set so that combine editing, in which any two of a plurality of tracks are combined to form a single track, and divide editing, in which one track is divided into a plurality of new tracks, can be easily performed. The following description concerns the change in TKI when two tracks are combined.

Figure 15:
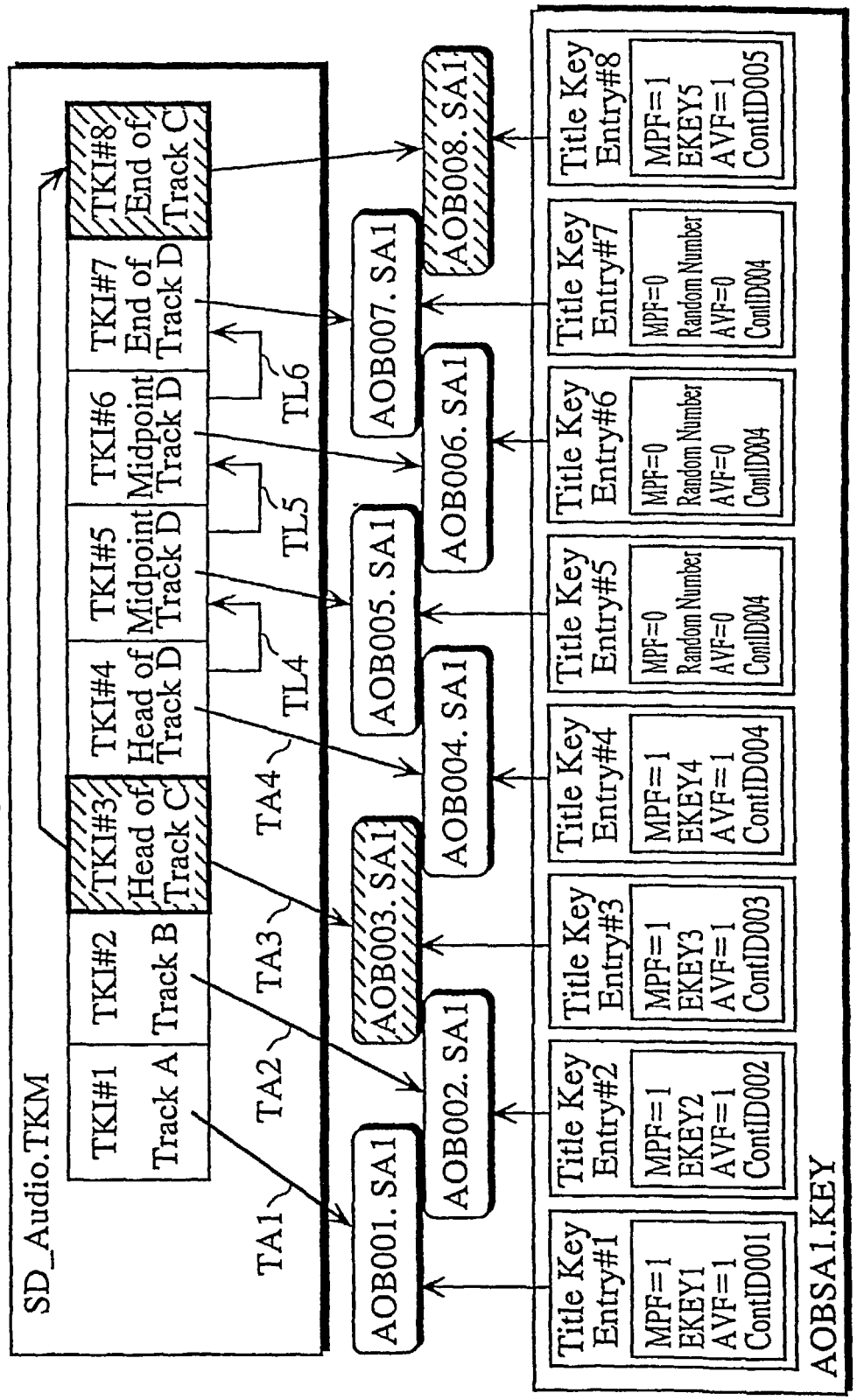
FIG. 15 shows how TKIs are set when two tracks are combined into one.

FIG. 15 shows how the TKIs are set when two tracks are combined to produce a single new track. The following description is based on the assumption that the user inputted an instruction to perform combine editing on Track.C and Track.E shown in FIG. 13 so as to generate a single new track. In this case, the AOBs that correspond to Track.C and Track.E are written into the AOB files AOB003.SA1 and AOB008.SA1 corresponding to TKI#3 and TKI#8, so that the TKI_BLK_ATRs of TKI#3 and TKI#8 are rewritten. FIG. 15 shows the TKI_BLK_ATRs of these TKIs after rewriting. In FIG. 13, the TKI_BLK_ATRs of TKI#3 and TKI#8 are respectively written as "Track.C" and "Track.E". However, in FIG. 15, the TKI_BLK_ATR of TKI#3 is rewritten as "Head of Track C", and the TKI_BLK_ATR of TKI#8 is rewritten as "End_of_Track C". By rewriting the TKI_BLK_ATRs in this way, TKI#3, TKI#8, AOB003.SA1, AOB008.SA1, TKE#3, and TKE#8 end up being treated as parts of a single new track "Track. C". During this operation, TKE#3 and TKE#8 corresponding to AOB003 and AOB008 are respectively given the original content IDs "003" and "005", and the original encryption keys "EKey#3" and "EKey#5", and the MPFs and the AVFs are set to "1".

Figure 16:
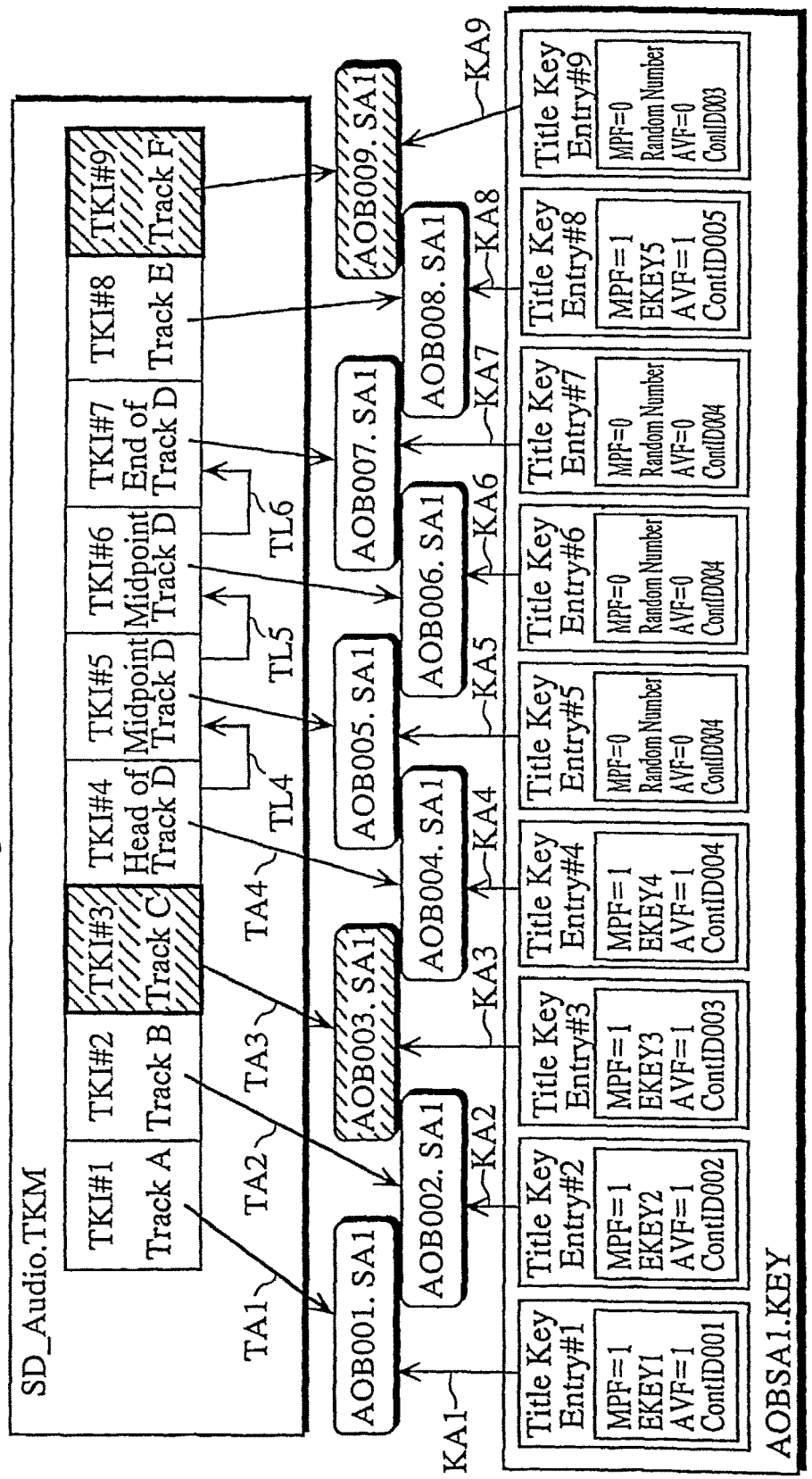
FIG. 16 supposes that one track is divided into two tracks.

The following is a description of the change in TKI when a track is divided. FIG. 16 shows an example in which a track is divided into two new tracks. In this example, it is assumed that the user inputted an instruction to perform divide editing on Track.C shown in FIG. 13 so as to generate two tracks "Track.C" and "Track.F". When Track.C is divided into Track.C and Track.F, AOB#3 forming Track.C is divided into new AOBs. A number "009" is assigned to one of the new AOBs (a new AOB009 is obtained) because numbers between 001 and 008 have already been assigned to AOBs, and TKI#9 and TKE#9 are generated for AOB009.SA1. This results in the situation shown in FIG. 16. TKE#9 includes the content ID "003" assigned to AOB003, EKEY#3 is used to encrypt AOB003, and a MPF and an AVF are set to "0". This completes the explanation of the TKI_BLK_ATR. Next, the explanation of the constituent elements of the TKI will be resumed.

TKI_LNK_PTR contains a TKIN for a link target TKI. As shown by arrows TL4, TL5, and TL6 in FIG. 13, the TKI_LNK_PTR for each of TKI#4, TKI#5, TKI#6, and TKI#7 corresponding to the four AOB files forming Track D are set so as to indicate the next TKI.

ISRC contains the ISRC (International Standard Recording Code) in the TKGI.

BIT (block information table) shows which part of a corresponding AOB is valid (AOB_BLOCK). By updating the BIT, it is possible to cut the head and end of an AOB.

Figure 17:
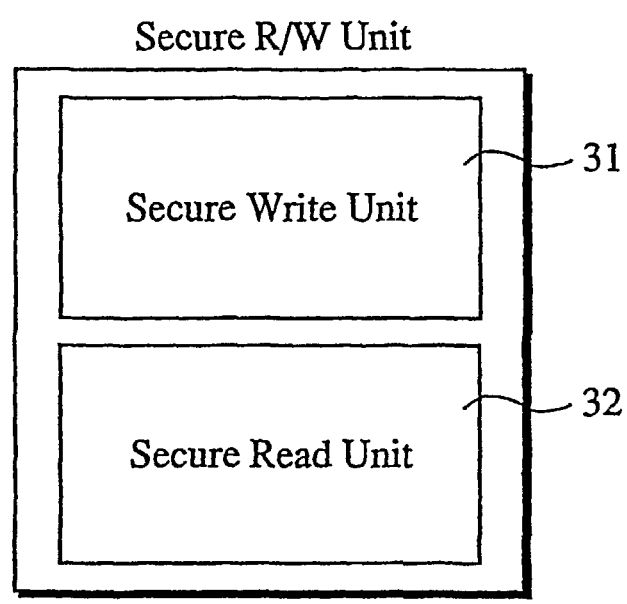
FIG. 17 shows the internal structure of the secure R/W unit 17 of the recording and playback PD 3 and the secure R/W unit 22 of the license management apparatus 1.

The following description concerns the constructions of the rec/play PD 3 and the license management apparatus 1 of the second embodiment. The difference between the constructions of the rec/play PD 3 and the license management apparatus 1 of the second embodiment and the rec/play PD 3 and the license management apparatus 1 of the first embodiment is a secure R/W unit 26, of which the internal structure is shown in FIG. 17. When the rec/play PD 3 is connected to the SD memory card 2, the secure R/W unit 26 performs AKE processing with the SD memory card 2 by using the MKB and media ID, and encrypts and decrypts data by using a session key Ks. Also, when the license management apparatus 1 is connected to the SD memory card 2, the secure R/W unit 26 performs AKE processing with the SD memory card 2 by using the MKB and media ID, and encrypts and decrypts data by using a session key Ks.

Figure 18:
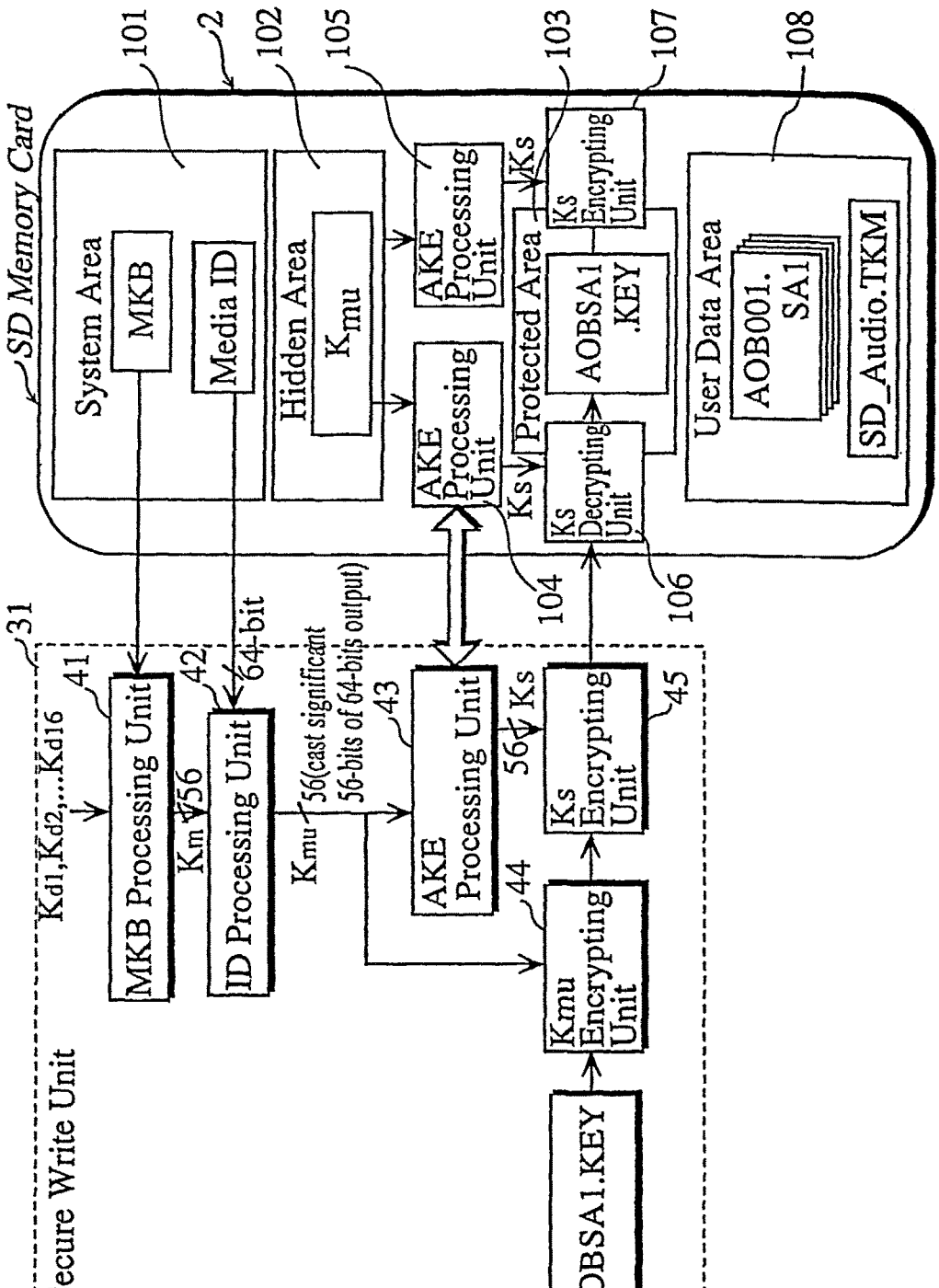
FIG. 18 shows the internal structure of the secure write unit 31.

As shown in FIG. 18, the secure write unit 31 includes an MKB processing unit 41, an ID processing unit 42, an AKE processing unit 43, a Kmu encrypting unit 44, and a Ks encrypting unit 45.

The MKB processing unit 41 reads an MKB stored in the system area of the SD memory card 2, and a device key Kd attached by the manufacturer of the rec/play PD 3 and the license management apparatus 1. The MKB processing unit 41 obtains a 56-bit encryption key Km by performing a specific calculation by using the MKB and the device key Kd, and then outputs the encryption key Km to the ID processing unit 42.

Upon receiving the encryption key Km from the MKB processing unit 41, the ID processing unit 42 reads a media ID from the system area 1 of the SD memory card 2, and performs a specific calculation to obtain a 64-bit calculation result, the lower 56-bits of which are output to the AKE processing unit 43 and the Kmu encrypting unit 44 as the encryption key Kmu.

The AKE processing unit 43 performs AKE processing by using the encryption key Kmu which is calculated by the ID processing unit 42, and the encryption key Kmu on the SD memory card 2. The AKE processing unit 43 then outputs the 56-bit session key Ks resulting from this calculation to the Ks encrypting unit 45.

The Kmu encryption unit 44 outputs the TKE that is included in the AOBSA1.KEY which is to be written into the SD memory card 2 to the Ks encrypting unit 45 by using the encryption key Kmu which is output by the ID processing unit 42.

The Ks encrypting unit 45 further encrypts the TKE that is included in the AOBSA1.KEY encrypted by the Kmu encrypting unit 44, by using the 56 bit session key Ks which is output from the AKE processing unit 43, outputs the further encrypted TKE to the SD memory card 2, and has the TKE written into the protected area 103.

Figure 19:
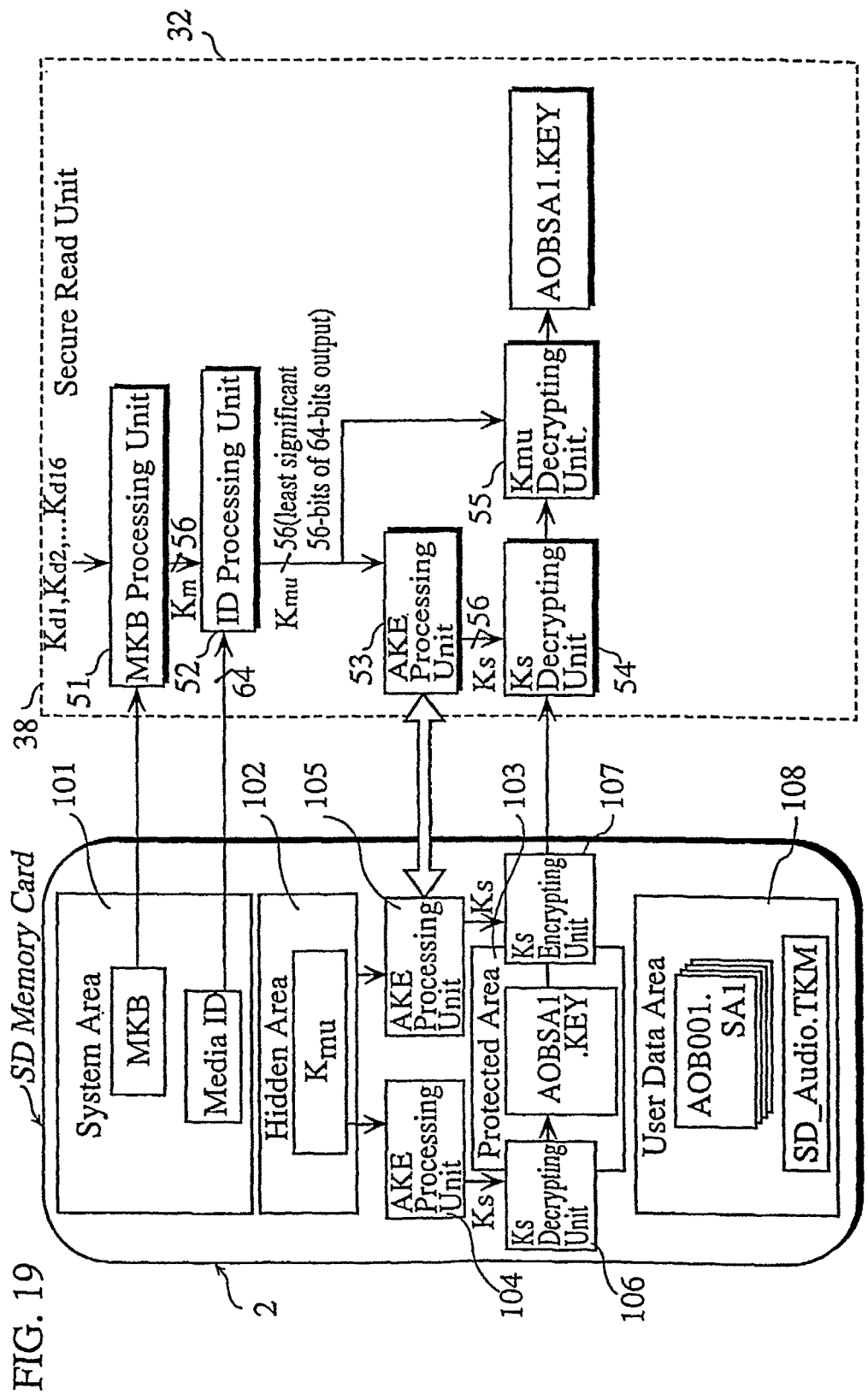
FIG. 19 shows the internal structure of the secure read unit 32.

The internal structure of the secure read unit 32, as shown in FIG. 19, includes an MKB processing unit 51, an ID processing unit 52, an AKE processing unit 53, a Ks decrypting unit 54, and a Kmu decrypting unit 55.

Once the SD memory card 2 is connected to the rec/play PD 3 and the license management apparatus 1, the MKB processing unit 51 reads an MKB from the system area 101, and performs a specific calculation by using a device key Kd, thereby obtaining a 56-byte encryption key Km.

The ID processing unit 52 reads a media ID from the system area 101 of the connected SD memory card 2, performs a specific calculation by using the encryption key Km which is calculated by the MKB processing unit 51 and the read media ID, and obtains a 64-bit calculation result, the lower 56 bits of which the ID processing unit 52 outputs to the AKE processing unit 53 and the Kmu decrypting unit 55 as an encryption key Kmu.

The AKE processing unit 53 performs AKE processing with the AKE processing unit 105 of the SD memory card 2 by using the encryption key Kmu which is output from the Ks decrypting unit 54, and outputs the 56-bit calculation result to the Ks decrypting unit 54 as a session key Ks.

The Ks decrypting unit 54 reads the encrypted AOBSA1.KEY (including the TKE) stored in the protected area 103 of the SD memory card 2, and decrypts the AOBSA1.KEY by using the 56-bit session key Ks output from the AKE processing unit 53. Then, the Ks decrypting unit 54 outputs the decryption result to the Kmu decrypting unit 55.

The Kmu decrypting unit 55 decrypts the TKE in the AOBSA1.KEY by using the 56-bit encryption key Kmu which is calculated by the ID processing unit 52.

As explained above, access of the protected area 103 of the SD memory card 2 is accompanied by encryption, decryption, and an AKE procedure, by using a section key Ks and a Kmu. This prevents access by an improper device, and means that authentic reading and writing is performed only by the recording and playback apparatus 3 and the license management apparatus 1.

Next, an operation example of when the license management apparatus 1 performs migration through the secure R/W unit 22 will be explained with reference to FIG. 20.

Figure 20:
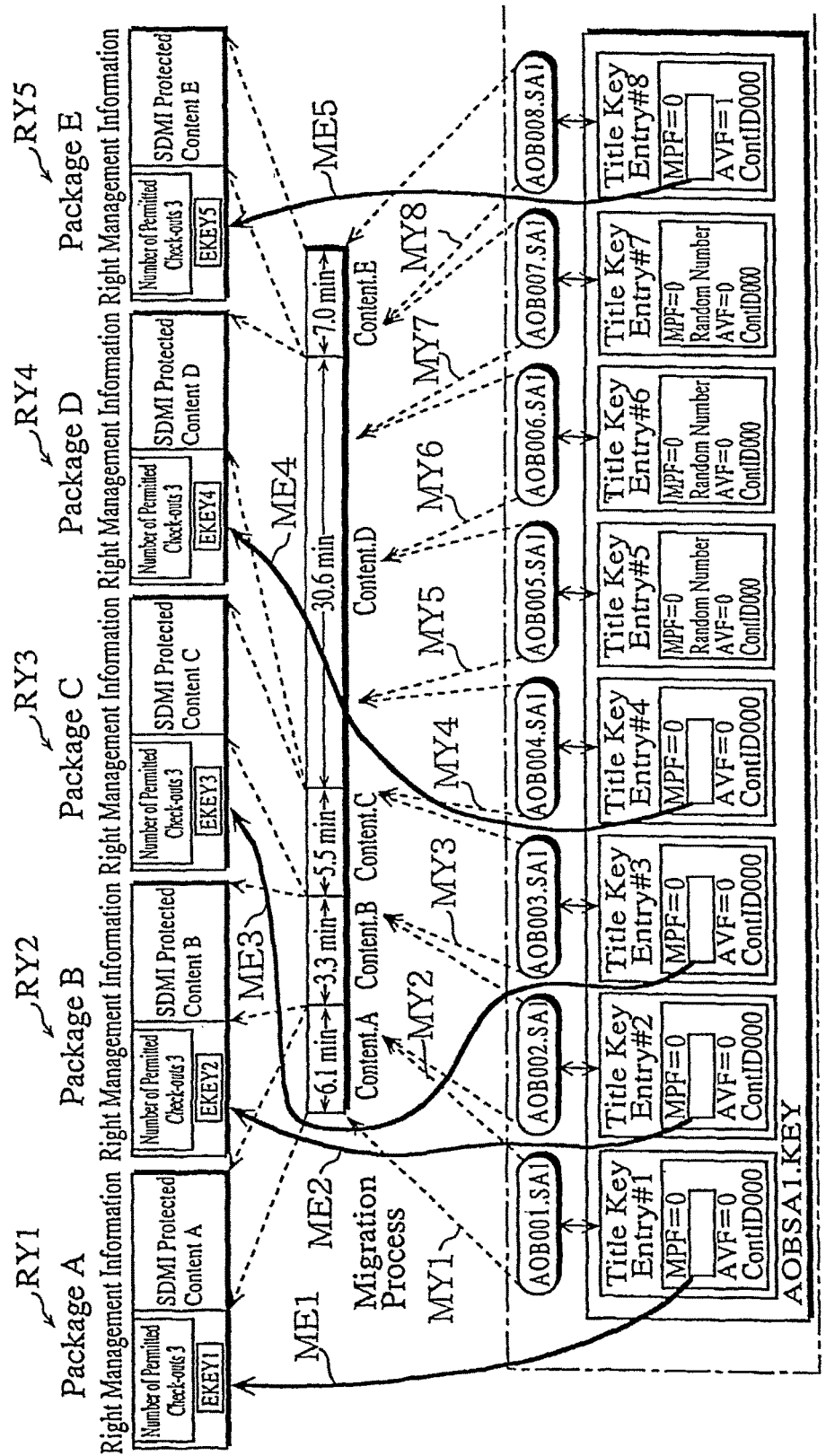
FIG. 20 shows a migration procedure being performed on eight AOBs and eight TKEs.

FIG. 20 shows a migration procedure of the eight AOBs and the eight TKEs shown in FIG. 13. If a migration process is performed for the eight TKEs shown in FIG. 13, the AOBs #1 to #3 and #8 shown in FIG. 13 are stored in the local storage 21 as SDMI protected contents A, B, C, and E respectively, as shown by arrows MY1, MY2, MY3, and MY8. AOBs #4 to #7 which correspond to one packaged content are stored in the local storage 21 as an SDMI protected content D, as shown by arrows MY4, MY5, MY6, and MY7. Next, as shown by arrows RY1, RY2, RY3, RY4, and RY5, RMI is generated for the five contents Content. A to Content. E, and a permitted number of check-out times "3" and EKEYs #1 to #5 stored in TKEs #1 to #5 are stored, as shown by arrows ME1, ME2, ME3, ME4, and ME5. The MPF and the AVF of each of the 8 TKEs is set to "0", the content ID is set to "000", and the EKEYs in the TKEs #1 to #5 are overwritten with a random number. In this way, AOB #1 to AOB #8 in the SD memory card 2 are put into non-reproduction states.

When an operation to combine tracks is performed, the LCM 23 performs migration in the following way. First, the LCM 23 finds tracks for which the content ID in the TKE differs, regardless of whether the TKI_BLK_ATR shows a common head of track and end of track for a track. It is considered that regardless of whether the content ID is different, tracks for which the TKI_BLK_ATR shows the head of track and end of track of one track were originally separate tracks that have been subsequently combined into one or more tracks by editing.

If the LCM 23 finds a head of track and an end of track which have the same content ID, the LCM 23 puts these tracks back into the original one track before performing migration. Namely, in an example in FIG. 15, the LCM 23 finds the Head of Track C and the End of Track C, which have content IDs 003 and 005 respectively, and makes these back into Track C and Track E before performing migration.

When one track is divided into two or more tracks as shown in FIG. 16, migration is performed in the following way after making the tracks back into the original track. First, the LCM 23 refers to the TKE of each track, and finds tracks which for which the content ID in the TKE is the same, regardless of whether the TKI_BLK_ATR shows different tracks.

It is considered that regardless of whether the TKI_BLK_ATR shows different tracks, tracks for which the content ID in the TKE are the same were originally one track that has been subsequently divided into two or more tracks by editing.

When the LCM 23 finds tracks which have the same content ID, the LCM 23 puts these tracks back into the one original track before performing migration. Namely, in the example in FIG. 16, the LCM 23 finds Track C and Track F which have the same Content ID 003, puts these tracks back into one Track C, and performs migration.

According to the BIT settings, when the head of track and the end of track of an AOB have been cut in sections, the LCM 23 puts the BIT settings back to their original state and then performs migration.

The LCM 23 of the second embodiment returns a track back to an equivalent state to the packaged content when combine, divide, or sectional cut operations have been performed on the track. Therefore, the LCM 23 is able to manage a plurality of AOBs, TKEs, and TKIs in the states in FIG. 15 and FIG. 16 in the state shown in FIG. 13, in other words, an equivalent state to that which is recorded on the CD. According to this, even if editing is performed after a work is written in a PD and before migration is performed by an LCM, the unity of the packaged content is not interfered with.

Figure 21:
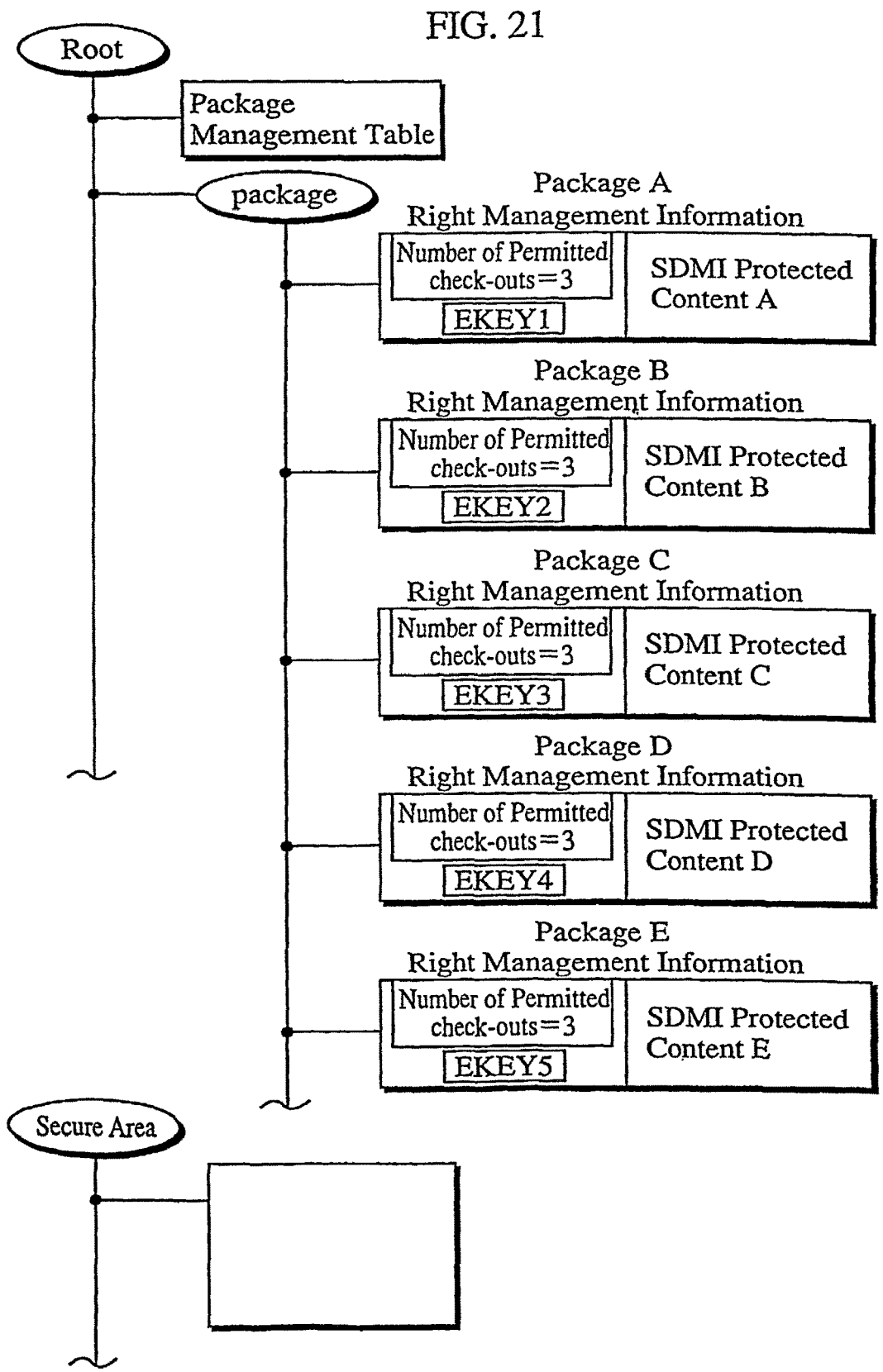
FIG. 21 shows the structure of directories and files in the local storage 21 of the license management apparatus 1.

FIG. 21 shows the structure of directories and files in the local storage 21. As shown in FIG. 21, a user area, which can be accessed even by a general application program, and a secure area, which can only be accessed by the LCM 23 and to which access is prohibited by other application programs, are provided in the local storage area 21. A package directory for storing SDMI protected content is provided in the root directory of the user area. This package directory is a directory in which SDMI protected content is stored, and the five packaged contents shown in FIG. 20 are stored here. Each of the five packages stores a set of SDMI protected content and RMI.

A package management table is located in the user area. The package management table is composed of, for each package, an index number, a file pass showing where the package is stored, and content introduction information showing the artist name and title for the content which corresponds to the package. The user area knows which content is stored in which directory and under which file name by referring to the package management table. The package management table is used when the user interface 20 displays a list of SDMI content that is stored in the local storage 21.

Next, the secure area will be explained. The secure area stores information that should not be rewritten by the user, such as billing information, and a check-out history information table, which is made up of check-out history information about each content, is also stored here. In the state shown in FIG. 21, check-out has not yet been performed, and therefore, the check-out history information is blank.

Figure 22:
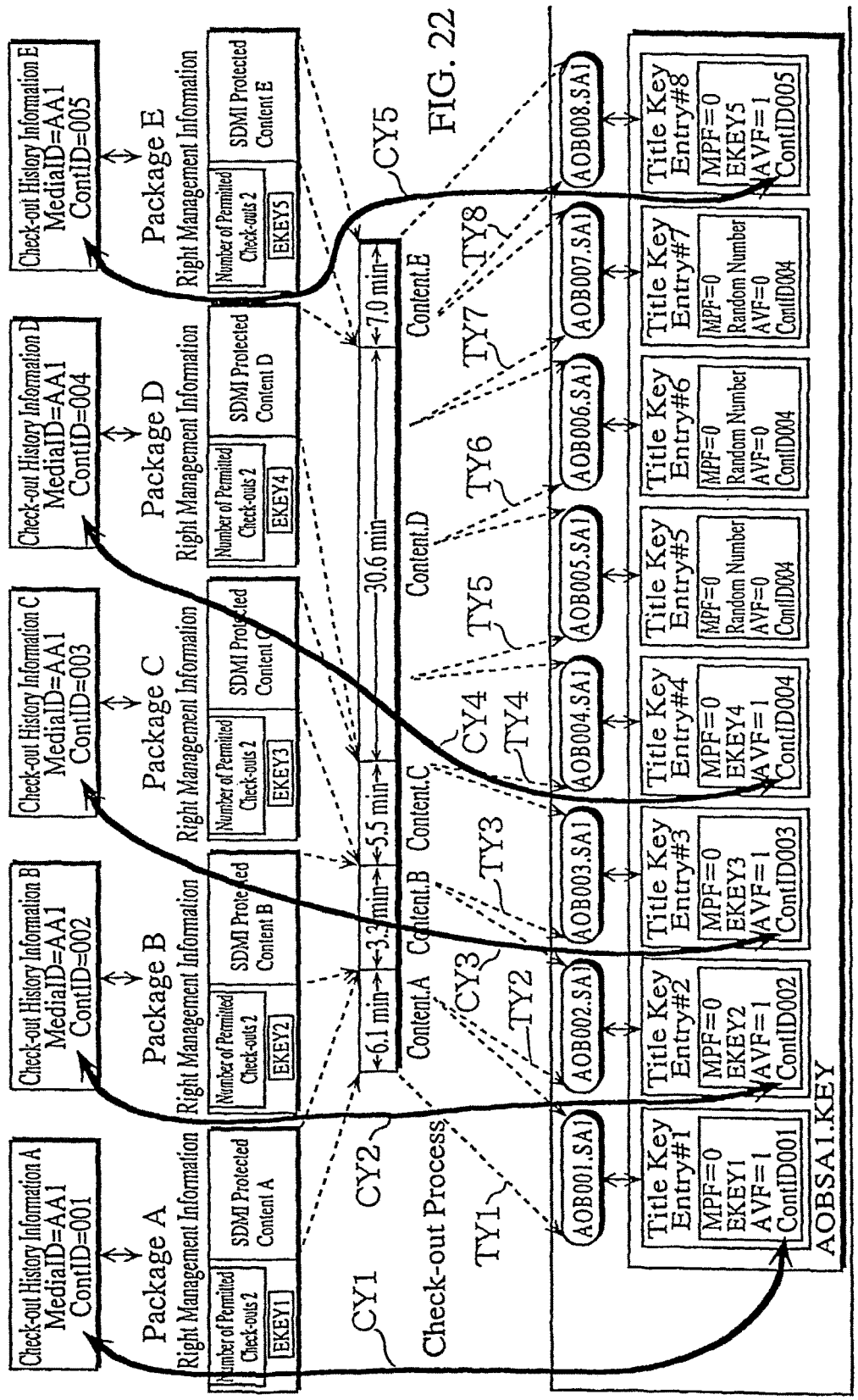
FIG. 22 shows the eight AOBs and the eight TKEs stored in the SD memory card 2, according to check-out.
Figure 23:
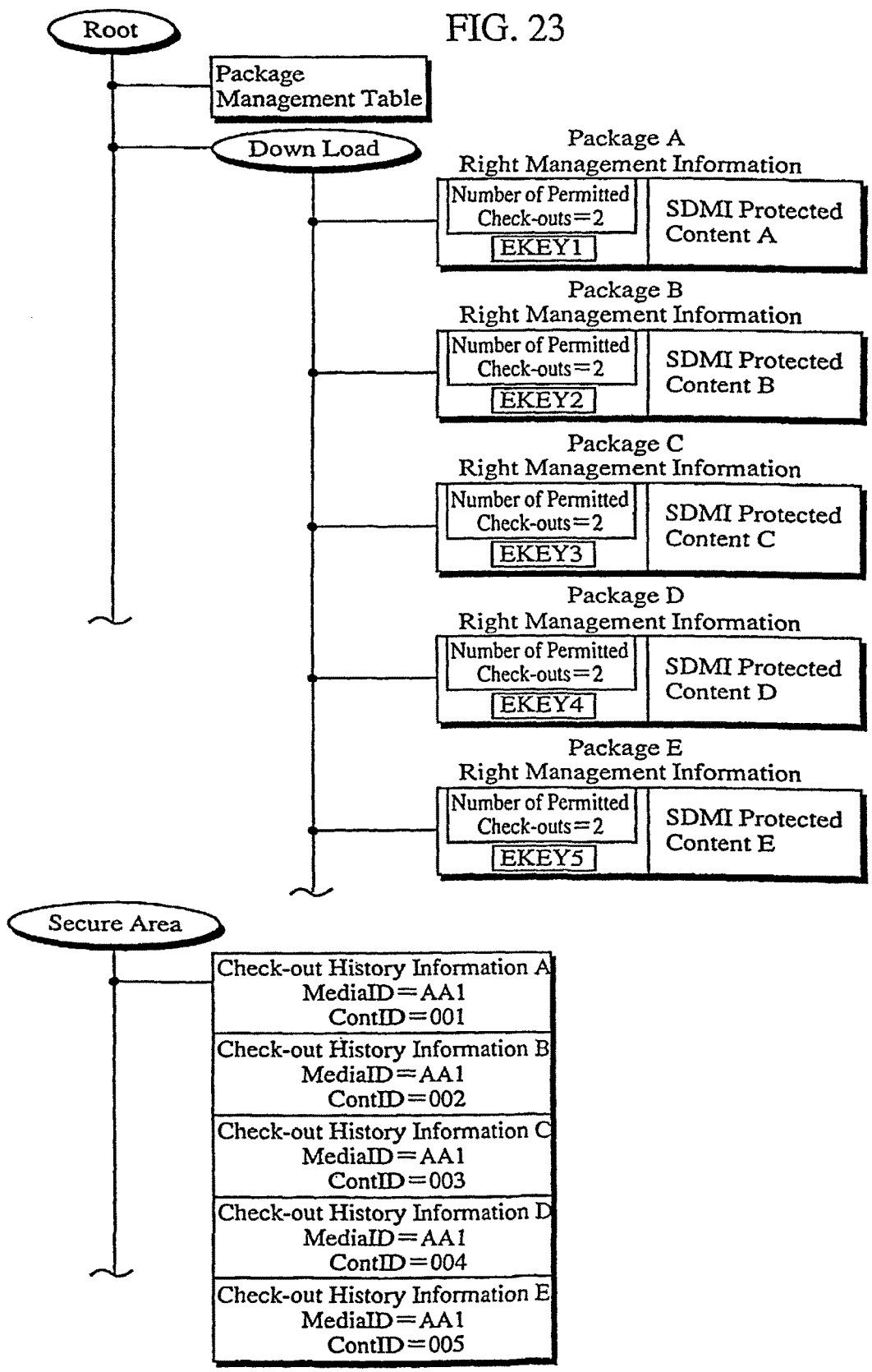
FIG. 23 shows the contents of the local storage 21 after check-out has been executed.

Next, an explanation will be given for how check-out is performed on the five SDMI protected contents Content A to Content E. FIG. 22 shows how eight AOBs and eight TKEs are stored in the SD memory card 2, by check-out. Check-out is instructed by the user and Content A, Content B, Content C, and Content E are written into the SD memory card 2 as individual units AOB#1, AOB#2, AOB#3, and AOB#8, as shown by arrows TY1, TY2, TY3, and TY8. Content D is written into the SD memory card 2 as AOB#4 to AOB#7, as shown by arrows TY4, TY5, TY6, and TY7. Then, TKEs #1 to #8 are generated to correspond to AOB#1 to AOB#8 respectively, and TKEs #1 to #5, Content IDs 001 to 005, and AVFs are written, with the MPFs remaining at "0". Then, the number of permitted check-outs is decremented and set to 2. Check-out history information is generated in correspondence with the Media ID "AA1" and the Content IDs 001 to 005, and is stored in the local storage 21. FIG. 23 shows the storage content of the local storage 21 after check-out has been executed. The difference between FIG. 23 and FIG. 21 is that in FIG. 23 the number of permitted check-outs has been decremented from 3 to 2, and check-out history information A to E has been generated in the secure area.

Figure 24:
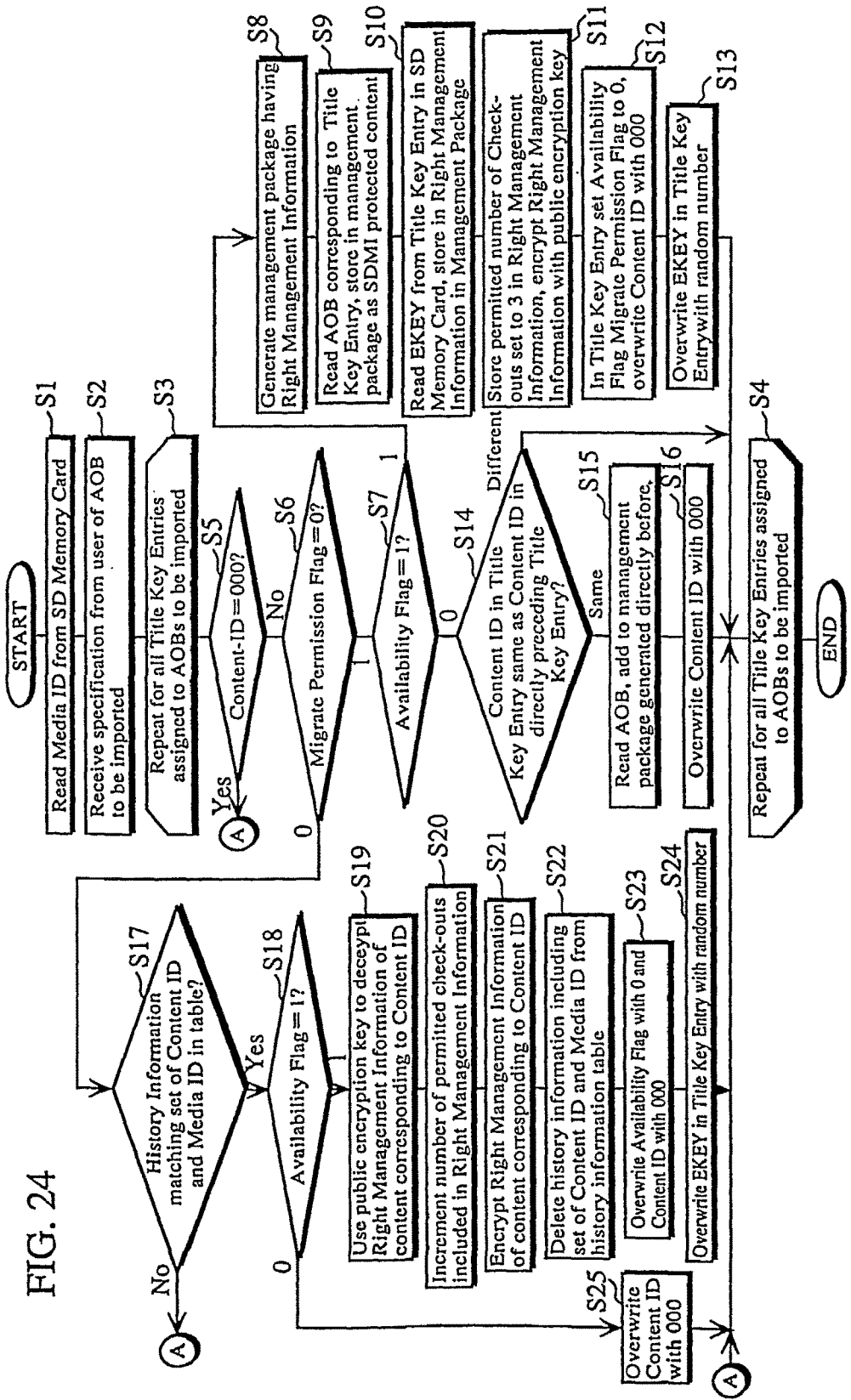
FIG. 24 is a flowchart showing the procedures of the LCM (licensed complaint module) 23 of the second embodiment of the present invention.

Next, operations of the license management apparatus 1 of the second embodiment explained above will be explained with reference to a flowchart. FIG. 24 is a flowchart showing the procedures of the LCM 23 of the second embodiment. At step S1, the LCM 23 reads the media ID from the SD memory card 2, and at step S2, the LCM 23 refers to the file entry in the SD memory card 2 and displays a list of the plurality of AOBs which are written in the SD memory card 2. Each AOB written in the SD memory card 2 is displayed in the same way without distinction regardless of whether it is an AOB written according to check-out or whether it is an AOB written by the rec/play PD 3. Please note that it is possible to have the LCM 23 read the MPF and display only AOBs for which migration is permitted. Next, the LCM 23 receives a specification from the user of which of the plurality of AOBs are to be retrieved. If the AOBs to be retrieved into the license management apparatus 1 are specified by, for instance, a drag specification, the LCM 23 proceeds to a loop procedure in which Step S3 and S4 are repeating conditions. The loop procedure is a procedure repeating steps S5 to S25 of the TKEs corresponding to each AOB that is specified at step S2. The following will focus on explaining the procedure for one of the TKEs.

At step S5, the LCM 23 judges whether the content ID in the TKE is 000. If the content ID is 000, there is no AOB corresponding to the TKE, and therefore, the LCM 23 proceeds to S4 via (A) which is the next TKE to be processed. If the content ID is not 000, it is possible that the TKE is to be migrated. Therefore, the LCM 23 proceeds to step S6 and judges whether the MPF is "1" or "0". A TKE written by the rec/play PD 3 is set to "1", and is clearly distinguishable from a TKE written by the license management apparatus 1. Therefore, if the MPF is set to "1", the LCM 23 proceeds to step S7. At step S7, the LCM 23 judges whether the AVF is "1" or "0". If the AVF is "1", this means that either the TKE being processed has a one-to-one relationship with the packaged content, or the TKE being processed is the head of track among a plurality of TKEs which correspond to one packaged content (TKE #4 in the example in FIG. 13). If the AVF is "1", the LCM 23 proceeds to step S8 and generates a management package which has RMI. Next, at step S9, the LCM 23 reads the AOB which corresponds to the TKE, and stores the AOB as SDMI protected content in the management package. At step S10, the LCM 23 reads the EKEY from the TKE in the SD memory card 2, and stores the EKEY in the RMI in the management package. At step S11, the LCM 23 stores the number of permitted check-outs, which is set to "3", in the RMI, and encrypts the RMI with a public encryption key. The result of the above-described process is that the AOB which is written into the SD memory card 2 is put under the management of the license management apparatus 1 as SDMI protected content.

Next, at step 12, the LCM 23 sets the AVF and the MPF in the TKE to "0", and overwrites the content ID with "000". At step S13, the LCM 23 overwrites the EKEY in the TKE with a random number. By overwriting the TKE, the AOB is set in a non-reproduction state.

At step S7, if the LCM 23 judges the AVF to be "0", the LCM 23 considers the TKE which is being processed to be a part of a one of a plurality of TKEs which correspond to one packaged content, excluding the head of track (TKE #5, #6, #7). Therefore, at step S14, the LCM 23 judges whether the content ID in the TKE is the same as the content ID in the directly proceeding TKE. If the judgment at step S14 is positive, at step S15, the LCM 23 reads and adds the AOB to the management package most recently generated, and then, at step S16, overwrites the content ID with 000.

When the MPF is set to "0" and migration is not permitted, the LCM 23 proceeds from step S6 to step S17, and judges whether check-out is permitted. Namely, the LCM 23 judges whether check-out information matching the set of the content ID and the media ID exists in the local storage 21. If matching check-out information does not exist, it is clear that the TKE was not written according to a check-out by the license management apparatus 1, and the LCM 23 proceeds to step S4 via (A) without performing check-out. On the other hand, if check-out history information does exist, at step S18, the LCM 23 judges whether the AVF is "1". As explained earlier, if the AVF is "1", this means that either the TKE being processed has a one-to-one correspondence to the packaged content, or that the TKE is the head of track TKE among a plurality of TKEs that correspond to one packaged content (TKE #4 in the example in FIG. 13). If the TKE being processed is one of these, at step S19, the LCM 23 decrypts the RMI of the SDMI protected content corresponding to the content ID by using the public encryption key. At step S20, the LCM 23 increments the permitted number of check-outs which are included in the RMI, and, at step S21, encrypts the RMI of the SDMI protected content corresponding to the content ID. The LCM 23 deletes the check-out history information which includes the set of the content ID and the media ID from the check-out history information table at step S22, overwrites the AVF with "0" and the content ID with "000" at step S23, and overwrites the EKEY with a random number at step S24.

At step S18, when the AVF is "0", the TKE is one of a plurality of TKEs which correspond to one package content, excluding the head of track, and only the content ID in this TKE is valid. Therefore, the LCM 23 overwrites the content ID with "000" as step S25.

According to the above-described second embodiment, TKEs are stored in the protected area 103 which cannot be accessed unless the authenticity of a connected device can be proved, and therefore, tampering with the MPFs is prevented. Consequently, migration of AOBs which are written by the rec/play PD 3 can be realized while paying thorough consideration to the copyright protection of a content.

Third Embodiment

In SDMI, there is a concept which is similar to migrate called "move", and the third embodiment of the present invention relates to an improvement when an AOB which is to be moved and an AOB which is to be migrated are both written into the same SD memory card 2. The following is a brief description of the difference between migration as explained in the first and second embodiments and moving.

Moving is performed on AOBs which are obtained according to electronic music distribution. Such an AOB has RMI which includes the number of permitted check-outs, and the AOB can be transferred within an SDMI domain in the range of the number of moves that are permitted.

In contrast, AOBs which are to be migrated have a MPF and may only be transferred once from a PD to an SDMI domain.

Figure 25:
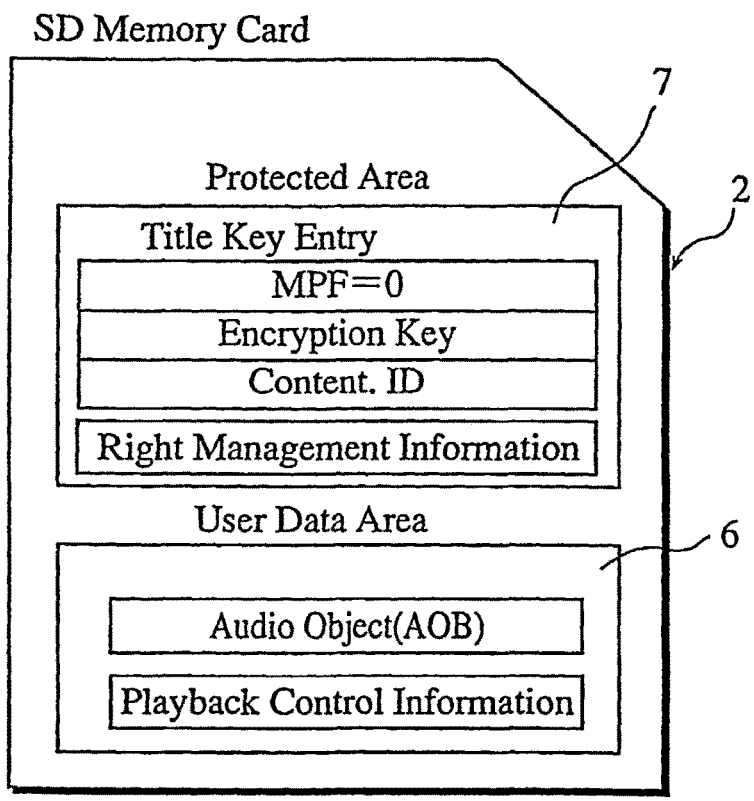
FIG. 25 shows a setting example of the MPF of the third embodiment of the present invention.

Therefore, the decisive difference between an AOB to be migrated and an AOB to be moved is that an AOB to be migrated does not have RMI, and is in a state to be received by the SDMI domain, in other words, a transient state until receiving protection in the SDMI domain. In order to distinguish an AOB to be migrated and an AOB to be moved, in the third embodiment the MPF of an AOB for which RMI is already written into the SD memory card 2 is also set to "0". FIG. 25 shows a setting example for the MPF in the third embodiment.

According to the third embodiment, an AOB to be moved can be prevented from being migrated by setting the MPF to "0".

Details of the data structures and various processing disclosed in the first to the third embodiments are described in international patent publications listed below, which may be referred to for further technical details.

WO 0065602 (Nov. 2, 2000)
WO 0074054 (Dec. 7, 2000)
WO 0074059 (Dec. 7, 2000)
WO 0074060 (Dec. 7, 2000)
WO 0116821 (Mar. 8, 2001)

Furthermore, it should be obvious that the present invention is not limited to the examples described above. Further representative variations (A)-(G) are described below.

(A) An explanation was given for audio data obtained by code compressing packaged content which is recorded on a CD, but audio data may be obtained by code compressing packaged content which is recorded on, for instance, a DVD-Audio or a cassette tape.

Furthermore, "1" being "on" and meaning that migration is permitted, and "0" being "off" and meaning that migration is not permitted is merely an example of settings. Accordingly, "0" may be "on" and mean that migration is permitted, and "1" may be "off" and mean that migration is not permitted.

(B) The rec/play PD 3 has a screening unit 10 and performs code compression of packaged content, but the code compression of the packaged content may be performed by the license management apparatus 1 itself.

(C) The rec/play PD 3 may be realized as a component stereo, a mobile telephone, or a PDA (Personal Digital Assistant). Furthermore, the rec/play PD 3 may be a component type recording and playback PD in which the rec/play PD 3 is integrated with a playback apparatus which reproduces, for instance, CDs or DVD-Audio. The license management apparatus 1 is realized on a personal computer, but may be, for instance, a radio/cassette, a component stereo, or an STB (Set Top Box), that has an internal storage apparatus.

(D) In the first and second embodiments, an encryption key and a number of permitted check-outs are stored in the RMI, but other information may be stored. Such other information may be, for instance, information showing whether playback of SDMI protected content in the personal computer (license management apparatus 1) is permitted (PC playback permission information), or information limiting the number of playbacks.

(E) The procedures which were explained by using function blocks and the procedure which was explained by using a flow chart (FIG. 24) in the above-described embodiments may be realized according to an executable program, and this program may be recorded on a recording medium and sold or distributed. This kind of recording medium may be, for instance, an IC card, an optical disk, or a floppy disk, and the machine language program thereon may be used by being installed on a general-purpose computer. The general-purpose computer successively executes the installed machine language program, and realizes the license management apparatus 1 and the recording and playback apparatus of the first and second embodiments.

(F) In the first and second embodiments, data that is to be migrated is audio data, but the data may be other stream data such as moving images. In such a case, when a PD obtains moving image stream data from, for instance, a moving picture distribution service, the stream data may be written on the SD memory card 2 with a MPF set to "1". The license management apparatus 1 may perform migration after confirming that the MPF is set to "1". According to this, the stream data is managed in the license management apparatus 1 with the RMI. Then, when check-out of the stream data is performed, the license management apparatus 1 writes the MPF which has been set to "0" and the stream data on the SD memory card 2.

(G) The watermark detector 12 in the first embodiment removes a watermark from audio data when the watermark detector 12 detects a watermark, but the watermark may be rewritten. Namely, the watermark detector 12, upon detecting a watermark, may decipher the watermark. If the result of this deciphering is "copying permitted", the watermark detector rewrites the watermark as "copying prohibited", and outputs to the encrypting unit 15.

INDUSTRIAL USE

In one SDMI system among a plurality of SDMI systems for protecting copyright, a PD performs code compression of a packaged content recorded on a CD, and the license management apparatus 1 can retrieve the code compressed packaged content safely, which allows for an increased user convenience without sacrificing the profits to the copyright holder. Therefore, various manufacturers involved in making the license management apparatus 1 and the rec/play PD 3 make significant contributions to the device manufacturing industry by manufacturing and introducing, into the market, the license management apparatus 1, the SD memory card 2, and the rec/play PD 3, the value of which is high as products for increased user convenience without sacrificing the profits to copyright holder.

Although the present invention has been fully described by way of example with reference to the accompanying drawings, it is to be noted that various changes and modifications will be apparent to those skilled in the art. Therefore, unless such changes and modifications depart form the scope of the present invention, they should be construed as being included therein.

The invention claimed is:

1. A method of using a system to perform a migration of an audio object to generate right management information for the audio object,
wherein the system includes:
a memory card including an authentication circuit, a protected area accessible only when the authentication circuit determines that an apparatus to which the memory card is connected is legitimate, and a non-protected area accessible regardless of whether or not the authentication circuit determines that the apparatus is legitimate; and
a plurality of apparatuses including an apparatus having a right management module and an apparatus without the right management module, the apparatus having the right management module including a processor controlling the right management module to perform the migration of the audio object by recording the audio object and to generate the right management information for the audio object,
wherein said method comprises:
authenticating, via the authentication circuit, the apparatus to which the memory card is connected by determining whether the apparatus is a legitimate apparatus when the apparatus is connected to the memory card;
recording a plurality of files onto the non-protected area via one of (i) the apparatus without the right management module and (ii) the apparatus having the right management module, each file recorded onto the non-protected area being identifiable by a serial number and including an audio object, which is encrypted audio data generated according to an encryption key;

recording, onto the protected area, a rule management file including a plurality of rule entries, each rule entry included in the rule management file (i) corresponding one-to-one to each file recorded onto the non-protected area, (ii) including a serial number matching the serial number of the corresponding file, (iii) including an encryption key of the audio object of the corresponding file, and (iv) including a flag for indicating either OFF or ON for the audio object of the corresponding file, wherein, when the flag indicates OFF, the flag serves to indicate that the migration of the audio object of the corresponding file has been performed by the apparatus having the right management module, and the right management information for the audio object of the corresponding file has been generated by the apparatus having the right management module, and wherein, when the flag indicates ON, the flag serves to indicate that the migration of the audio object of the corresponding file has not been performed, the right management information for the audio object of the corresponding file has not been generated, and the audio object of the corresponding file has been recorded onto the non-protected area by the apparatus without the right management module;

at some point in time:
 prohibiting copying of the audio object of the corresponding file from the non-protected area when the flag indicates OFF; and
 permitting copying of the audio object of the corresponding file from the non-protected area when the flag indicates ON;

receiving a recording instruction from a user;

upon receiving the recording instruction, (i) externally receiving, via the apparatus without the right management module, an audio signal, (ii) obtaining, via the apparatus without the right management module, at least one audio object by encoding the audio signal, and (iii) writing, via the apparatus without the right management module, the obtained audio object into the memory card together with the right management information, wherein
 each audio object, which is written into the memory card via said writing by the apparatus without the right management module, is one of (i) an audio object that corresponds to one content of a plurality of contents, and (ii) a divided audio object from among at least two audio objects that have been obtained by dividing one content of the plurality of contents, the one content being divided and recorded by one of (i) the apparatus without the right management module, and (ii) the apparatus having the right management module,
 each rule entry, which is recorded onto the memory card via said recording of the rule management file by the apparatus without the right management module and which corresponds to a file (i) of the plurality of files stored on the non-protected area and (ii) including the audio object corresponding to one content, stores a content ID identifying the one content, and the flag, and
 wherein each rule entry, which corresponds to a file (i) of the plurality of files stored on the non-protected area and (ii) including the divided audio object from among the at least two audio objects obtained by dividing the one content, stores a content ID identifying the audio object from among the at least two audio objects of the one content, and includes a head rule entry storing the flag;

reading, via the apparatus having the right management module, (i) the audio object corresponding to the one content from the non-protected area of the memory card and (ii) the rule entry corresponding to the read audio object from the protected area of the memory card;

performing, via the apparatus having the right management module and based on the flag of the read rule entry, the migration of the read audio object by recording the read audio object onto the non-protected area of the memory card;

generating, via the apparatus having the right management module and based on the flag of the read rule entry, the right management information for the read audio object, the flag of the read rule entry controlling whether or not the apparatus having the right management module generates the right management information for the read audio object, and the apparatus having the right management module only being permitted to perform the migration of the read audio object by recording the read audio object onto the non-protected area and the generation of the right management information for the read audio object when the flag of the read rule entry indicates ON; and performing, via the apparatus having the right management module, a check-out of the read audio object read from the memory card by recording the read audio object to the non-protected area of another memory card based on the right management information generated by the apparatus having the right management module.

2. The method of claim 1, further comprising:

recording a plurality of pieces of track information in the non-protected area, each piece of track information corresponding one-to-one to the files that store the audio objects, such that each piece of track information includes a time search table that shows a plurality of cue addresses, at a pre-determined time interval, of the corresponding file that includes the audio object; and setting a time length of each section of divided content, such that a total number of the cue addresses in the time search table is no greater than a predetermined number.

* * * * *